United States Patent
Sengupta et al.

(10) Patent No.: US 11,700,586 B2
(45) Date of Patent: Jul. 11, 2023

(54) RESYNCHRONIZATION SIGNAL TRANSMISSION IN WIRELESS COMMUNICATIONS

(71) Applicant: QUALCOMM Incorporated, San Diego, CA (US)

(72) Inventors: Ayan Sengupta, San Diego, CA (US); Alberto Rico Alvarino, San Diego, CA (US); Le Liu, Fremont, CA (US); Gowrisankar Somichetty, Bangalore (IN); Xiao Feng Wang, San Diego, CA (US); Wanshi Chen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/370,377

(22) Filed: Jul. 8, 2021

(65) Prior Publication Data
US 2021/0337492 A1    Oct. 28, 2021

Related U.S. Application Data

(63) Continuation of application No. 16/355,142, filed on Mar. 15, 2019, now Pat. No. 11,089,558.

(30) Foreign Application Priority Data

Mar. 29, 2018  (IN) .............................. 201841011929

(51) Int. Cl.
*H04W 56/00* (2009.01)
*H04J 11/00* (2006.01)
(Continued)

(52) U.S. Cl.
CPC ....... *H04W 56/001* (2013.01); *H04J 11/0069* (2013.01); *H04L 5/005* (2013.01);
(Continued)

(58) Field of Classification Search
CPC .................................................. H04W 56/001
See application file for complete search history.

(56) References Cited

U.S. PATENT DOCUMENTS

| | | |
|---|---|---|
| 2014/0241150 A1 | 8/2014 | Ng et al. |
| 2015/0223245 A1 | 8/2015 | Cheng et al. |

(Continued)

FOREIGN PATENT DOCUMENTS

| | | |
|---|---|---|
| CN | 106464404 A | 2/2017 |
| CN | 107735976 A | 2/2018 |

(Continued)

OTHER PUBLICATIONS

Intel Corporation: "System Acquisition Time Reduction for efeMTC", 3GPP Draft; R1-1802371, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018, Feb. 17, 2018, XP051397896, 6 pages, Retrieved from the Internet: URL: http://www.3gpp.org/ftp/tsg%5Fran/WG1%5FRL1/TSGR1%5F92/Docs/ [retrieved on Feb. 17, 2018] section 2.

(Continued)

*Primary Examiner* — Ivan O Latorre
*Assistant Examiner* — Won Tae C Kim
(74) *Attorney, Agent, or Firm* — Holland & Hart LLP

(57) ABSTRACT

A resynchronization signal (RSS) may extend across multiple physical resource blocks (PRBs) or subframes, which may cause the RRS to be scheduled to overlap with other downlink transmissions. Methods, systems, and devices for wireless communications are described for management of RSS and one or more other transmission types that may have overlapping wireless resources with the RSS. If one or more other downlink transmissions are scheduled for resources that overlap with resources scheduled for an RSS transmis- (Continued)

sion, the UE may receive the RSS transmission or the one or more other downlink transmissions, or a combination thereof, based on a prioritization of the transmission types of the one or more other downlink transmissions relative to RSS. The RSS transmission or the one or more other transmissions may be delayed, dropped, punctured, or rate-matched when the RSS transmission and the one or more other downlink transmissions conflict.

18 Claims, 20 Drawing Sheets

(51) Int. Cl.
    *H04L 5/00*         (2006.01)
    *H04L 27/26*       (2006.01)
    *H04W 72/0446*   (2023.01)

(52) U.S. Cl.
    CPC .......... *H04L 5/0048* (2013.01); *H04L 5/0064* (2013.01); *H04L 27/2655* (2013.01); *H04W 56/005* (2013.01); *H04W 56/0015* (2013.01); *H04W 72/0446* (2013.01); *H04J 2011/0096* (2013.01)

(56) References Cited

U.S. PATENT DOCUMENTS

| | | | |
|---|---|---|---|
| 2016/0174238 A1* | 6/2016 | Chen | H04L 1/0045 370/336 |
| 2017/0064685 A1 | 3/2017 | Rico Alvarino et al. | |
| 2017/0070312 A1 | 3/2017 | Yi et al. | |
| 2017/0118792 A1 | 4/2017 | Rico Alvarino et al. | |
| 2018/0054792 A1 | 2/2018 | Lee et al. | |
| 2019/0306812 A1 | 10/2019 | Sengupta et al. | |
| 2020/0053675 A1 | 2/2020 | Khoryaev et al. | |

FOREIGN PATENT DOCUMENTS

| | | |
|---|---|---|
| EP | 3125633 A1 | 2/2017 |
| EP | 3404970 A1 | 11/2018 |
| EP | 3487138 A1 | 5/2019 |
| WO | WO2017123047 A1 | 7/2017 |
| WO | WO2018014831 A1 | 1/2018 |

OTHER PUBLICATIONS

International Search Report and Written Opinion—PCT/US2019/022750—ISA/EPO—dated Jun. 3, 2019.
International Preliminary Report on Patentability—PCT/US2019/022750, The International Bureau of WIPO—Geneva, Switzerland, dated Oct. 8, 2020.
Samsung: "Discussion on Enhanced Synchronization Signals and Re-Synchronization Signals," 3GPP Draft; R1-1801923-Discussion on Enhanced Synchronization Signals and Re-Synchronization Signals, 3rd Generation Partnership Project (3GPP), Mobile Competence Centre; 650, Route Des Lucioles; F—vol. RAN WG1, No. Athens, Greece; Feb. 26, 2018-Mar. 2, 2018, Feb. 16, 2018, XP051397069, 2 pages, Retrieved from the Internet: URL: http://www.3gpp.org/ftp/tsg%5Fran/WG1%5FRL1/TSGR1%5F92/Docs/ [retrieved on Feb. 16, 2018] section 3.

* cited by examiner

RESYNCHRONIZATION SIGNAL TRANSMISSION IN WIRELESS COMMUNICATIONS

CROSS REFERENCES

The present Application for Patent is a continuation of U.S. patent application Ser. No. 16/355,142 by Sengupta et al., entitled "Resynchronization Signal Transmission in Wireless Communications," filed Mar. 15, 2019, now U.S. Pat. No. 11,089,558 issued Aug. 10, 2021, which claims the benefit of India Provisional Patent Application No. 201841011929 by Sengupta et al., entitled "Resynchronization Signal Transmission in Wireless Communications," filed Mar. 29, 2018, each of which is assigned to the assignee hereof and expressly incorporated herein.

BACKGROUND

The following relates generally to wireless communication, and more specifically to resynchronization signal transmission in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

A resynchronization signal (RSS) may provide for increasing energy density and improving timing detection properties of synchronization signals. In some cases, an RSS extends across multiple physical resource blocks (PRBs) or subframes, and this or other factors may cause the RSS to be scheduled to overlap with other downlink transmissions. The described techniques relate to improved methods, systems, devices, or apparatuses that support RSS transmissions and implement one or more sets of prioritization rules for managing one or more other overlapping transmissions that may be transmitted concurrently with the RSS. Generally, the described techniques provide for efficient identification of RSS resources and techniques for managing one or more other transmissions that may have overlapping wireless resources with the RSS. According to some aspects of the present disclosure, certain UEs may be capable of receiving and processing an RSS and may signal an indication of this capability to a base station, either implicitly (e.g., via UE category or capability indication) or explicitly (e.g., via dedicated signaling that indicated RSS processing capability).

In cases where one or more other downlink transmissions may have resources that collide with RSS resources, the UE may receive and/or decode the RSS or the one or more other concurrent transmissions, or both, by implementing a set of prioritization rules. In some cases, the one or more sets of prioritization rules may also be implemented by a base station, which may result in the delaying, puncturing, or rate-matching of one or more transmissions when the RSS and another transmission are scheduled to collide. In some cases, the RSS may be delayed or punctured by one or more other transmissions (e.g., transmissions having a higher priority than the RSS). In some cases, one or more other transmissions may be rate-matched around the RSS, or punctured by the RSS, or scheduled so as to be non-overlapping with the RSS (e.g., for transmissions having a lower priority than the RSS). A base station communicating with such a UE may identify the UE capability and implement one or more corresponding sets of prioritization rules for transmission of RSS and one or more other concurrent transmissions. In some cases, the base station may select a set of prioritization rules based on one or more conditions, such as a type of communications with the UE (e.g., mobile broadband (MBB) transmissions or coverage enhancement (CE) mode transmissions), a type of system information block (SIB) used to signal RSS information (e.g., a SIB1 or SIB1-BR), a transmission mode (e.g., if the UE is operating in cell-specific reference signal (CRS) mode or demodulation reference signal (DMRS) mode), or any combination thereof.

A method of wireless communication is described. The method may include transmitting, from a UE, an indication to a base station that the UE is capable of processing a RSS, determining, at the UE, that an RSS transmission is scheduled for first wireless resources that at least partially overlap with second wireless resources scheduled for another transmission of the one or more transmission types, and receiving, from the base station, the RSS transmission or the other transmission, or any combination thereof, based on one or more prioritization rules that prioritize one or more transmission types relative to the RSS.

An apparatus for wireless communication is described. The apparatus may include a processor, memory in electronic communication with the processor, and instructions stored in the memory. The instructions may be executable by the processor to cause the apparatus to transmit, from a UE, an indication to a base station that the UE is capable of processing a RSS, determine, at the UE, that an RSS transmission is scheduled for first wireless resources that at least partially overlap with second wireless resources scheduled for another transmission of the one or more transmission types, and receive, from the base station, the RSS transmission or the other transmission, or any combination thereof, based on one or more prioritization rules that prioritize one or more transmission types relative to the RSS.

Another apparatus for wireless communication is described. The apparatus may include means for transmitting, from a UE, an indication to a base station that the UE is capable of processing a RSS, determining, at the UE, that an RSS transmission is scheduled for first wireless resources that at least partially overlap with second wireless resources scheduled for another transmission of the one or more transmission types, and receiving, from the base station, the RSS transmission or the other transmission, or any combination thereof, based on one or more prioritization rules that prioritize one or more transmission types relative to the RSS.

A non-transitory computer-readable medium storing code for wireless communication is described. The code may include instructions executable by a processor to transmit, from a UE, an indication to a base station that the UE is capable of processing a RSS, determine, at the UE, that an RSS transmission is scheduled for first wireless resources that at least partially overlap with second wireless resources scheduled for another transmission of the one or more transmission types, and receive, from the base station, the RSS transmission or the other transmission, or any combination thereof, based on one or more prioritization rules that prioritize one or more transmission types relative to the RSS.

In some examples of the method, apparatuses, and non-transitory computer-readable medium described herein, the first wireless resources and the second wireless resources may be in a same physical resource block (PRB) or subframe, and receiving the RSS transmission or the other transmission may include operations, features, means, or instructions for determining that the RSS transmission may be dropped for the PRB or subframe based on the one or more prioritization rules, and receiving, in the PRB or subframe, the other transmission and not the RSS transmission over the second wireless resources. In some cases, determining that the first wireless resources at least partially overlap with the second wireless resources comprises determining that the first wireless resources and the second wireless resources may be in a same PRB or subframe.

In some examples of the method, apparatuses, and non-transitory computer-readable medium described herein, the other transmission includes a PSS, SSS, or PBCH transmission, or any combination thereof.

In some examples of the method, apparatuses, and non-transitory computer-readable medium described herein, the other transmission includes a PBCH transmission carrying system information.

In some examples of the method, apparatuses, and non-transitory computer-readable medium described herein, the other transmission includes a physical downlink shared channel (PDSCH) transmission carrying system information.

In some examples of the method, apparatuses, and non-transitory computer-readable medium described herein, the other transmission may include operations, features, means, or instructions for determining, based on the one or more prioritization rules and determining that the first wireless resources overlap with the second wireless resources, that a portion of the downlink shared channel transmission may be punctured by the RSS transmission, receiving the RSS transmission over the first wireless resources and a non-punctured portion of the downlink shared channel transmission over a subset of the second wireless resources, and decoding the non-punctured portion of the downlink shared channel transmission. In some cases, determining that the first wireless resources at least partially overlap with the second wireless resources comprises determining that at least a portion of the first wireless resources overlap with at least a portion of the second wireless resources in time and frequency.

In some examples of the method, apparatuses, and non-transitory computer-readable medium described herein, the other transmission may include operations, features, means, or instructions for determining, based on the one or more prioritization rules and determining that the first wireless resources overlap with the second wireless resources, that a portion of the control channel transmission may be punctured by the RSS transmission, receiving the RSS transmission over the first wireless resources and a non-punctured portion of the control channel transmission over a subset of the second wireless resources, and decoding the non-punctured portion of the control channel transmission. In some cases, determining that the first wireless resources at least partially overlap with the second wireless resources comprises determining that at least a portion of the first wireless resources overlap with at least a portion of the second wireless resources in time and frequency.

In some examples of the method, apparatuses, and non-transitory computer-readable medium described herein, the other transmission may include operations, features, means, or instructions for refraining from decoding control channel candidates associated with the second wireless resources based on the one or more prioritization rules and determining that the first wireless resources at least partially overlap with the second wireless resources.

Some examples of the method, apparatuses, and non-transitory computer-readable medium described herein may further include operations, features, means, or instructions for monitoring for the RSS transmission in the first wireless resources based on the one or more prioritization rules.

In some examples of the method, apparatuses, and non-transitory computer-readable medium described herein, receiving the RSS or the other transmission may include operations, features, means, or instructions for determining that the RSS may be punctured by the other transmission or delayed based on the one or more prioritization rules, and monitoring for the other transmission in the second wireless resources.

A method of wireless communication at a base station is described. The method may include receiving, from a UE, an indication that the UE is capable of processing a RSS, determining, by the base station, that first wireless resources allocated to an RSS transmission at least partially overlap with second wireless resources allocated to another transmission of the one or more transmission types, and transmitting, to the UE, the RSS transmission or the other transmission, or any combination thereof, based on one or more prioritization rules that prioritize one or more transmission types relative to the RSS.

An apparatus for wireless communication at a base station is described. The apparatus may include a processor, memory in electronic communication with the processor, and instructions stored in the memory. The instructions may be executable by the processor to cause the apparatus to receive, from a UE, an indication that the UE is capable of processing a RSS, determine, by the base station, that first wireless resources allocated to an RSS transmission at least partially overlap with second wireless resources allocated to another transmission of the one or more transmission types, and transmit, to the UE, the RSS transmission or the other transmission, or any combination thereof, based on one or more prioritization rules that prioritize one or more transmission types relative to the RSS.

Another apparatus for wireless communication at a base station is described. The apparatus may include means for receiving, from a UE, an indication that the UE is capable of processing a RSS, determining, by the base station, that first wireless resources allocated to an RSS transmission at least partially overlap with second wireless resources allocated to another transmission of the one or more transmission types, and transmitting, to the UE, the RSS transmission or the other transmission, or any combination thereof, based on one or more prioritization rules that prioritize one or more transmission types relative to the RSS.

A non-transitory computer-readable medium storing code for wireless communication at a base station is described. The code may include instructions executable by a processor to receive, from a UE, an indication that the UE is capable of processing a RSS, determine, by the base station, that first wireless resources allocated to an RSS transmission at least partially overlap with second wireless resources allocated to another transmission of the one or more transmission types, and transmit, to the UE, the RSS transmission or the other transmission, or any combination thereof, based on one or more prioritization rules that prioritize one or more transmission types relative to the RSS.

In some examples of the method, apparatuses, and non-transitory computer-readable medium described herein, the first wireless resources and the second wireless resources may be in a same physical resource block (PRB) or subframe, and transmitting the RSS transmission or the other transmission may include operations, features, means, or instructions for dropping, for the PRB or subframe, the RSS transmission based on the one or more prioritization rules, and transmitting, in the PRB or subframe, the other transmission and not the RSS transmission over the second wireless resources. In some cases, determining that the first wireless resources at least partially overlap with the second wireless resources comprises determining that the first wireless resources and the second wireless resources may be in a same PRB or subframe.

In some examples of the method, apparatuses, and non-transitory computer-readable medium described herein, the other transmission includes a PSS, SSS, or PBCH transmission, or any combination thereof.

In some examples of the method, apparatuses, and non-transitory computer-readable medium described herein, the other transmission includes a PBCH transmission carrying system information.

In some examples of the method, apparatuses, and non-transitory computer-readable medium described herein, the other transmission includes a PDSCH transmission carrying system information.

In some examples of the method, apparatuses, and non-transitory computer-readable medium described herein, the other transmission may include operations, features, means, or instructions for puncturing, based on the one or more prioritization rules and determining that the first wireless resources overlap with the second wireless resources, a portion of the downlink shared channel transmission with the RSS transmission, and transmitting the RSS transmission over the first wireless resources and a remaining portion of the downlink shared channel transmission over a subset of the second wireless resources. In some cases, determining that the first wireless resources at least partially overlap with the second wireless resources comprises determining that at least a portion of the first wireless resources overlap with at least a portion of the second wireless resources in time and frequency.

In some examples of the method, apparatuses, and non-transitory computer-readable medium described herein, the other transmission may include operations, features, means, or instructions for puncturing, based on the one or more prioritization rules and determining that the first wireless resources overlap with the second wireless resources, the control channel transmission with the RSS transmission, and transmitting the RSS transmission over the first wireless resources and a remaining portion of the control channel transmission over a subset of the second wireless resources. In some cases, determining that the first wireless resources at least partially overlap with the second wireless resources comprises determining that at least a portion of the first wireless resources overlap with at least a portion of the second wireless resources in time and frequency.

In some examples of the method, apparatuses, and non-transitory computer-readable medium described herein, the prioritization may be based on one or more of a UE capability to process the RSS, a UE transmission mode, a bandwidth of SIB signaling, or any combination thereof.

DETAILED DESCRIPTION

Figure 1:
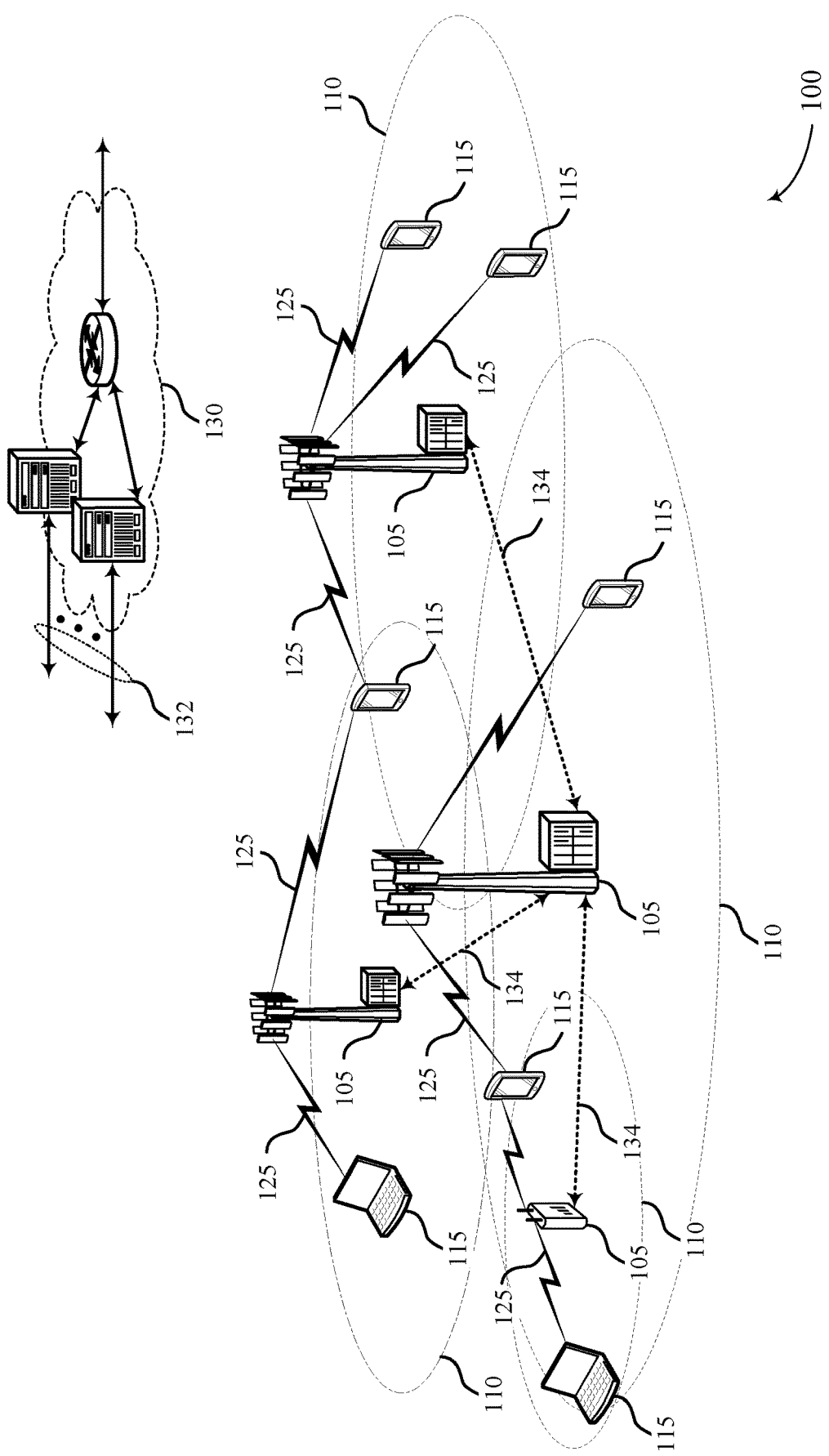
FIG. 1 illustrates an example of a system for wireless communication that supports resynchronization signal transmission in wireless communications in accordance with aspects of the present disclosure.

The described techniques relate to improved methods, systems, devices, or apparatuses that support resynchronization signal (RSS) transmissions that are concurrent with one or more other transmissions. Various examples implement prioritization rules that may be used to identify that an RSS or one or more other concurrent transmissions are to be punctured, rate-matched, delayed, or rescheduled, based on a scheduling conflict between RSS resources and resources of the one or more other transmissions. In some cases, a set of prioritization rules may be used to determine when an RSS or other transmissions (e.g., shared channel transmissions, control channel transmissions, reference signal transmissions, or other transmissions) are to be modified based on the presence of RSS resources. In some cases, a particular set of prioritization rules or portions thereof may be implemented (e.g., selected) based on operating modes of the UE or base station (e.g., a type of coverage enhancement (CE) mode of operation, or whether a cell-specific reference signal (CRS) or demodulation reference signal (DMRS) are used for channel estimation).

As indicated above, various aspects of the present disclosure relate to RSS transmission and interactions between RSS and other signals that may be overlapping with the RSS. RSSs may be implemented in some systems to help provide for efficient resynchronization of user equipment (UE) with a network to reduce latency for communications. Some fifth generation (5G) New Radio (NR) systems are designed to support user equipment (UEs) having low signal-to-noise ratio (SNR).

Using previous synchronization techniques, a UE may be configured to detect timing synchronization by combining signal energy from multiple instances of synchronization signals. In some aspects, synchronization signals for a cell include a primary synchronization signal (PSS) and a secondary synchronization signal (SSS). In some cases, for example where the UE is designed to operate at a low signal-to-noise ratio (SNR), detection for timing synchronization may involve combining signal energy from multiple instances of the PSS and/or SSS. Because of the energy density of the PSS and SSS signals, synchronization or resynchronization (where the UE has previously synchronized and maintains coarse timing information) may cause significant latency for communications. Increasing transmission power for the PSS and SSS may improve latency but may not be feasible because of transmission power limits or interference concerns.

In some cases, RSS transmissions may provide for increasing energy density and improving timing detection properties for transmission of a synchronization signal. An RSS may have a relatively long signal duration (e.g. 40 ms) with a relatively large periodicity (e.g. 400 ms) and may occupy a subset of a narrowband frequency range (e.g. 2 physical resource blocks (PRBs). In some cases, each cell may have its own unique RSS signal, and a UE may monitor for its camped cell's RSS (thus, lending the signal its "resynchronization" moniker).

In some cases, the UE may receive a first synchronization signal (e.g., PSS/SSS) for synchronizing with a cell. The first synchronization signal may be used by the UE for timing synchronization and detection of the cell identifier (ID) for the cell. In some examples, the first synchronization signal may be transmitted at a first periodicity. After receiving the first synchronization signal, the UE may camp on the cell in an idle mode (e.g., with or without entering a connected mode first) or a sleep mode (e.g., power-save state) for some period of time. In some examples, by transitioning into a sleep mode, the UE may lose symbol level synchronization with the cell. In cases where a cell may transmit an RSS, the RSS may be transmitted at a second periodicity different from the first periodicity of the first synchronization signal. For example, the second periodicity may be lower than the first periodicity and/or may be offset from the first periodicity. In some cases, the UE may be configured to use the RSS to re-acquire synchronization once the UE has been in sleep mode. In some examples, upon resynchronizing, the UE may be configured to communicate over the cell. Thus, once a UE has been in synchronization with a base station or has timing information related to the periodicity of the resynchronization signal, the present techniques enable the UE to regain timing synchronization with reduced latency and power expenditure.

As indicated, an RSS may have a relatively long signal duration which may lead to one or more other transmissions (e.g., shared channel transmissions, control channel transmissions, reference signal transmissions) overlapping with the RSS and having wireless resources that collide with RSS resources. In some cases, wireless resources for an RSS transmission may overlap with wireless resources for another transmission in time or frequency, or both—e.g., when the RSS wireless resources are scheduled for a same resource element as the other wireless resources (and thus overlap in time and frequency), or when the RSS wireless resources and the other wireless resources are included in the same physical resource block (PRB), subframe, or some other group of resources elements used for scheduling purposes (regardless of whether any individual resource element is common to the RSS wireless resources and the other wireless resources).

Various described techniques relate to improved methods, systems, devices, or apparatuses that support RSS transmissions and provide or otherwise implement one or more sets of prioritization rules for managing one or more other overlapping transmissions that may be transmitted concurrently with the RSS. According to some aspects of the present disclosure, certain UEs may be capable of receiving and processing an RSS and may signal an indication of this capability to a base station, either implicitly (e.g., via UE category or capability indication) or explicitly (e.g., via dedicated signaling that indicated RSS processing capability).

In cases where one or more other downlink transmissions may have resources that collide with RSS resources, the UE may receive and/or decode the RSS or the one or more other concurrent transmissions, or both, by implementing one or more sets of prioritization rules. In some cases, a base station may also implement the one or more sets of prioritization rules, which may provide for the base station delaying, puncturing, or rate-matching one or more transmissions when the RSS and another transmission are scheduled to collide. In some cases, the RSS may be delayed or punctured by one or more other transmissions having a higher priority than the RSS. Transmissions having a higher priority than RSS may include PSS, SSS, or physical broadcast channel (PBCH) transmissions and transmissions that include system information (e.g., PBCH or PDSCH transmissions carrying system information, which may in some cases be broadcast PDSCH transmissions).

In some cases, one or more other transmissions may be rate-matched around the RSS, or punctured by the RSS, or scheduled so as to be non-overlapping with the RSS (e.g., for transmissions having a lower priority than the RSS). Transmissions having a lower priority than RSS may include at least some data and control transmissions that do not include system information. A base station communicating with such a UE may identify the UE capability and use a corresponding one or more sets of prioritization rules for transmission of RSS and one or more other concurrent transmissions. In some cases, the base station may select a set of prioritization rules based on one or more conditions, such as a type of communications with the UE (e.g., MBB transmissions or CE-mode transmissions (such as CE mode A or CE mode B)), a type of SIB used to signal RSS information (e.g., a SIB1 or SIB1-BR), a transmission mode (e.g., if the UE is operating in CRS mode or DMRS mode), or any combination thereof.

Aspects of the disclosure are initially described in the context of a wireless communications system. Various examples of prioritization rules and their implementation for receiving concurrent RSS and other transmissions are then discussed. Aspects of the disclosure are further illustrated by and described with reference to apparatus diagrams, system diagrams, and flowcharts that relate to resynchronization signal transmission in wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved-Universal Terrestrial Radio Access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, one or more of the base stations 105 serving a cell may transmit a first synchronization signal for the cell at a first periodicity. The base station 105 may transmit an RSS for the cell at a second periodicity that is different from the first periodicity. In some cases, the RSS may include a plurality of repetitions of a first sequence that is based at least in part on a cell identifier of the cell. According to some aspects of the present disclosure, certain UEs 115 may be capable of receiving and processing an RSS and may signal an indication of this capability to the base station 105, either implicitly (e.g., via UE category or capability indication) or explicitly (e.g., via dedicated signaling that indicated RSS processing capability).

In some cases, one or more other downlink transmissions may have resources that collide with RSS resources, the UE 115 may receive the RSS or the one or more other concurrent transmissions, or both, according to (by implementing) one or more sets of prioritization rules. In some cases, the prioritization rules may also be implemented by a base station and may provide for delaying, puncturing, or rate-matching one or more transmissions when the RSS and another transmission are scheduled to collide. In some cases, the RSS may be delayed or punctured by one or more other transmission (e.g., for transmissions having a higher priority than the RSS). In some cases, one or more other transmissions may be rate-matched around the RSS, or punctured by the RSS, or scheduled so as to be non-overlapping with the RSS (e.g., for transmissions having a lower priority than the RSS). A base station 105 communicating with such a UE 115 may identify the UE 115 capability and use a corresponding set of prioritization rules for transmission of RSS and one or more other concurrent transmissions. In some cases, the base station 105 may select a set of prioritization rules based on one or more conditions, such as a type of communications with the UE 115 (e.g., MBB transmissions or CE mode transmissions), a type of SIB used to signal RSS information (e.g., a SIB1 or SIB1-BR), a transmission mode (e.g., if the UE is operating in CRS mode or DMRS mode), or any combination thereof.

Figure 2:
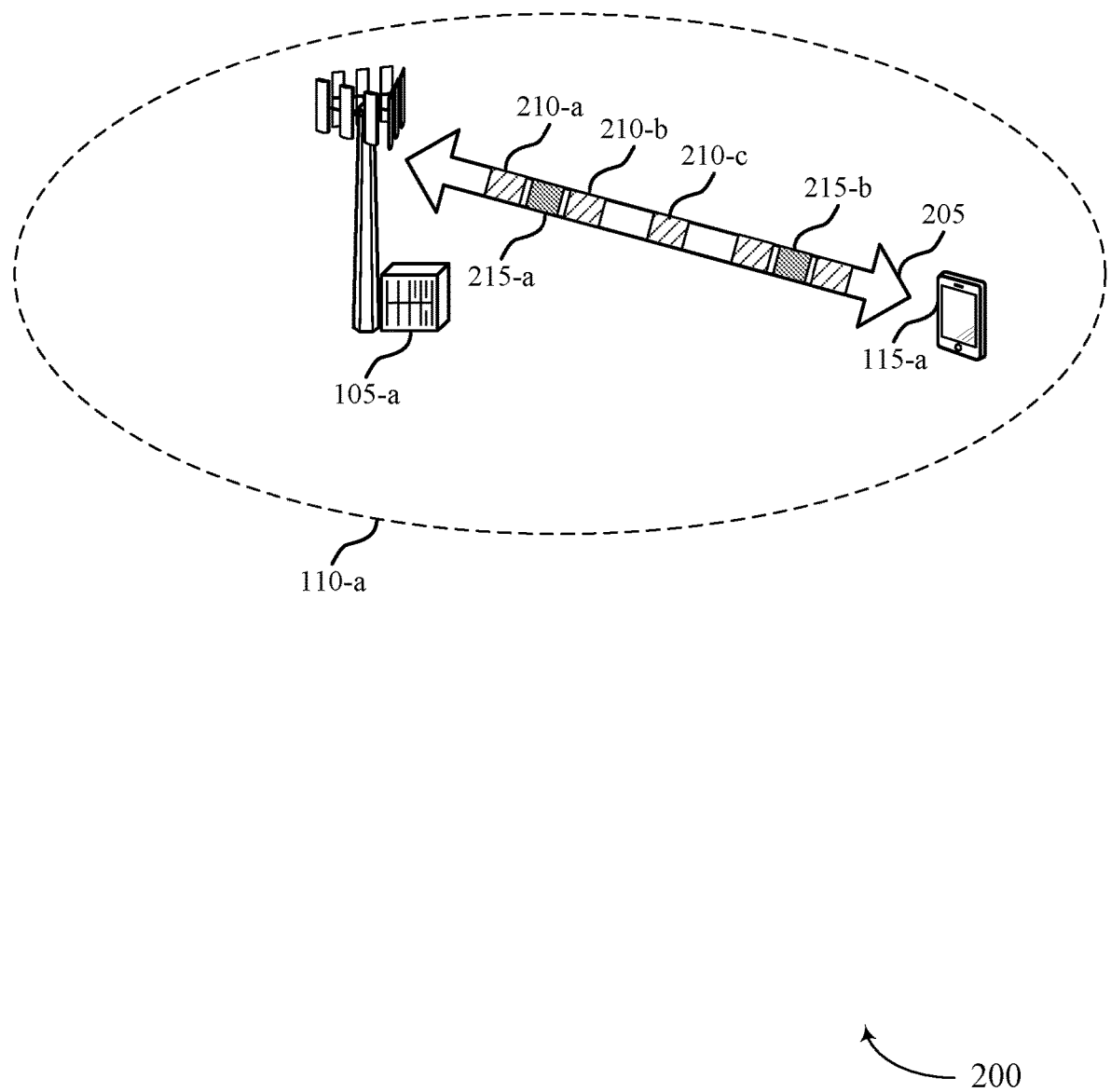
FIG. 2 illustrates an example of a wireless communication system that supports resynchronization signal transmission in wireless communications in accordance with aspects of the present disclosure.

FIG. 2 illustrates an example of a wireless communication system 200 that supports resynchronization signal transmission in wireless communications in accordance with various aspects of the present disclosure. In some examples, wireless communication system 200 may implement aspects of wireless communications system 100. In some examples, the wireless communication system 200 may include a base station 105-a and UE 115-a, which may be examples of the corresponding devices as described with reference to FIG. 1. UE 115-a may communicate with the base station 105-a within a geographic coverage area 110-a.

In some examples, the base station 105-a may utilize synchronization signals to perform cell acquisition procedures with UE 115-a. For example, the UE 115-a may utilize PSS and SSS for synchronizing with a cell. In one example, synchronization signals may be transmitted over a carrier 205 for a cell. The synchronization signals may be conveyed using synchronization sequences. In some cases, the UE 115-a may receive a synchronization signal (e.g., PSS/SSS) for synchronizing with a cell served by the base station 105-a. In the example of FIG. 2, the UE 115-a may subsequently receive a first instance of the synchronization signal 210-a, a second instance of the synchronization signal 210-b, and a third instance of the synchronization signal 210-c. In some cases, the synchronization signal 210 may be used by the UE 115-a for timing synchronization and detection of a cell ID. For example, the UE 115-a may utilize the synchronization signal 210 to determine an ID associated with the cell served by the base station 105-a.

In various examples, the UE 115-a also may be configured to receive system information associated with the cell (not shown). For example, after receiving the synchronization signal, the system information may be received in form of a system information block (SIB). The SIB may signal a presence of an RSS on the carrier 205. In some cases, the UE 115-a may receive an indication of a second periodicity of the RSS, a length of the RSS, a frequency offset and/or a frequency location for the RSS. In some cases, the frequency offset may be based on a cell ID, as well as a frequency domain configuration of the RSS. The frequency offset based on frequency domain configuration of the RSS may reduce inter-cell collision. Additionally or alternatively, the SIB may indicate a transmit power for the RSS, a bandwidth of the RSS, a hopping pattern for the RSS, a multiplicative factor for the second periodicity, or an overhead percentage. In some cases, after an initial synchronization, the UE 115-a may transition out of a connected mode. In some cases, after the initial synchronization, the UE 115-a may lose synchronization by transitioning into a sleep mode.

According to some examples, the UE 115-a may receive the RSS 215 for resynchronizing with the cell. In the example of FIG. 2, the UE 115-a may subsequently receive a first instance of an RSS 215-a and a second instance of an RSS 215-b, according to a second periodicity. According to some aspects, the UE 115-a may use the RSS 215 to re-acquire synchronization. As previously described, the UE 115-a may receive a SIB indicating at least one of a presence of the RSS 215, the second periodicity, a length of the RSS 215, a frequency offset and/or a frequency location for the RSS 215, a transmit power for the RSS 215, a bandwidth of the RSS 215, a hopping pattern for the RSS 215, a multiplicative factor for the second periodicity, or an overhead percentage.

In some cases, the base station 105-a may transmit multiple types of SIBs. For example, UE 115-a may be a device that is capable of transmitting via a full wideband bandwidth with the base station 105-a, and the base station 105-a may provide a SIB1, and optionally one or more other SIBs, with various system information parameters. In other cases, UE 115-a may be a narrowband device that transmits cases using a relatively narrow bandwidth (e.g., a narrowband MTC device), and the base station 105-a may transmit a second type of SIB, referred to as a SIB1-BR, for such bandwidth reduced devices. In some cases, one or both types of SIBs may be used to signal RSS information.

As indicated above, the RSS 215, in some cases, may overlap with one or more other signals, such as a reference signal, the synchronization signal 210, a broadcast channel, a physical downlink shared channel (PDSCH), a physical downlink control channel (PDCCH), or combinations thereof. For example, the RSS 215 may be punctured by a CRS, PSS, SSS, a positioning reference signal (PRS) or a PBCH. Various aspects of the disclosure provide systems, devices, and methods for implementing a set of prioritization rules, which may be used to identify which of these different transmissions may puncture, rate match, delay, or result in different scheduling, relative to other of the transmissions.

Figure 3:
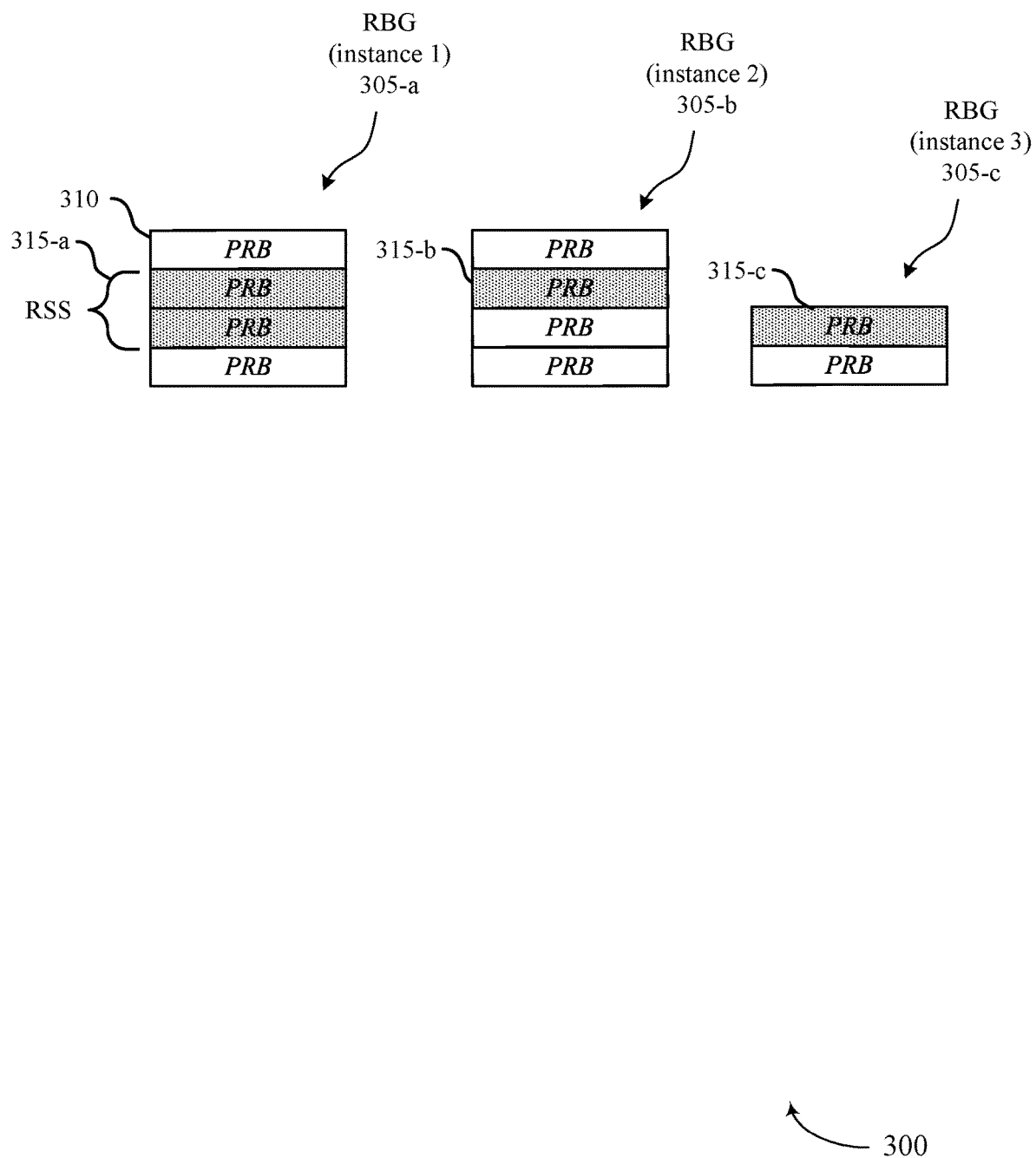
FIG. 3 illustrates an example of RSS resources that supports resynchronization signal transmission in wireless communications in accordance with aspects of the present disclosure.

FIG. 3 illustrates an example of RSS resources 300 that support resynchronization signal transmission in wireless communications in accordance with various aspects of the present disclosure. In some examples, RSS resources 300 may implement aspects of wireless communications system 100. As indicated above, an RSS 315 may occupy one or more PRBs 310 of an RBG 305. In some cases, a relative location of the RSS 315, in the frequency domain, maybe predefined with respect to an RBG 305. In the example of FIG. 3, a number of exemplary instances of RBGs 305-a through 305-c are illustrated, although it is to be understood that the example of FIG. 3 is for illustration and discussion only and an RSS may span other numbers PRBs within an RBG or may span multiple RBGs (e.g., if an RSS spans two PRBs and an RBG spans one PRB). In the example of FIG. 3, a first instance of an RBG 305-a has four PRBs 310 and includes an RSS 315-a that spans two PRBs. A second instance of an RBG 305-b may include an RSS 315-b that spans a single PRB, and a third instance of an RBG 305-c may include an RSS 315-c that spans one PRB of a two-PRB RBG. In cases where the RSS 315 may be transmitted to a narrowband UE, the relative frequency location of the RSS 315 may be provided with respect to the narrowband frequency resources (e.g., a contiguous group of 6 PRBs). Such frequency domain locations of the RSS 315 may provide that a relatively small number of RBGs or narrowbands are impacted the RSS 315. Such a predefined frequency location may also reduce overhead for RSS information provided in a SIB, and the SIB only needs to indicate the RBG or narrowband index, as opposed to a PRB index, to signal start of RSS.

In some cases, the relative locations of the RSS 315 may be dependent on system bandwidth, RBG size, a bandwidth of the RSS signal, or any combination thereof. For example, in a system with a bandwidth of 1.4 MHz and an RBG size of one PRB, an RSS with two PRBs may occupy two adjacent RBGs. In another example, a bandwidth may be 3 MHz or 5 MHz with an RBG size of two PRBs, may have the RSS with 2 PRBs located at first and second PRBs in the RBG. In another example, a bandwidth may be a 10 MHz bandwidth with an RBG size of three PRBs, may have the RSS with two PRBs located at first and second PRBs in the RBG. In a further example, for a 15 MHz or 20 MHz bandwidth with an RBG size of 4 PRBs, an RSS 215 with two PRBs 310 may be located at second and third PRBs in the RBG, such as illustrated in FIG. 3. In some cases, frequency hopping may be enabled for the RSS, and the RBG or narrowband relative starting location of RSS in the RBG/narrowband may remain the same across hops.

Figure 4:
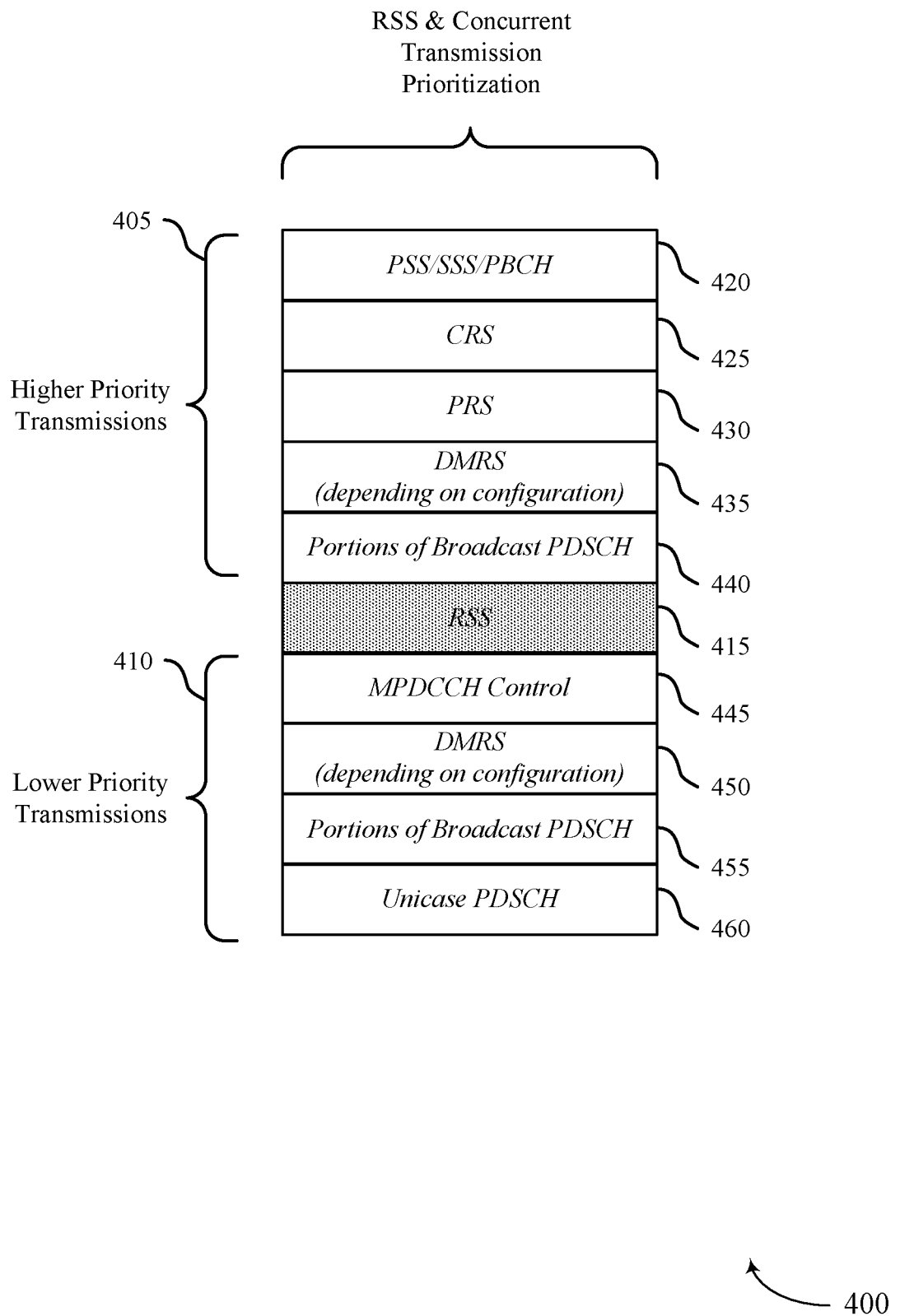
FIG. 4 illustrates an example of transmission prioritization rules that supports resynchronization signal transmission in wireless communications in accordance with aspects of the present disclosure.

FIG. 4 illustrates an example of how transmission prioritization rules 400 may support resynchronization signal transmission in wireless communications and be implemented in accordance with various aspects of the present disclosure. In some examples, transmission prioritization rules 400 may be implemented by aspects of wireless communications system 100. In some cases, transmission prioritization rules 400 may be implemented as a series of logical instructions (e.g., stored in a memory) that may be executed (e.g., a series of "if/then/else" statements) by a UE and base station to manage scheduling conflicts between RSS and other transmissions—e.g., to determine, by a UE, whether the RSS or other transmission, or a combination thereof, has been transmitted by the base station.

As indicated above, in cases where one or more other downlink transmissions may have resources that collide with RSS resources, a UE and a base station may each implement on or more sets of transmission prioritization rules 400 for interactions between the RSS 415 and one or more other concurrent transmissions, where the transmission prioritization rules 400 may be used for encoding, transmitting, receiving and decoding transmissions. In some cases, implementing the transmission prioritization rules 400 may provide for delaying, puncturing, or rate-matching one or more transmissions when the RSS 415 and another transmission are scheduled to collide. In the example of FIG. 4, the transmission prioritization rules 400 may indicate higher priority transmissions 405 and lower priority transmissions 410 relative to an RSS 415 transmission. As illustrated in the example of FIG. 4, a base station and UE may deprioritize RSS 415 based on the transmission prioritization rules 400 when RSS 415 is scheduled to collide with, for example, one or more of PSS/SSS/PBCH 420 symbols (e.g., when RSS is in same center 6 PRBs as PSS/SSS/PBCH), CRS 425 transmissions in CRS REs, PRS 430 transmissions in PRS REs or subframes, DMRS 435 transmissions if configured ahead of the RSS 415, portions of broadcast PDSCH 440 transmissions (e.g., control portions such as a SIB that provides RSS information), certain control transmissions, certain data transmissions, or combinations thereof. In such cases, the base station may puncture, delay, or drop RSS 415 transmission in the event of a collision (or scheduling conflict) with any of the higher priority transmissions 405.

A UE that is able to process the RSS 215 may be configured to implement transmission prioritization rules 400 and may determine that RSS 415 is punctured or delayed, either through implicit determination based on a resource allocation and preconfigured transmission prioritization rules 400, an explicit indication of transmission prioritization rules 400 (e.g., provided by the base station in RRC signaling), or combinations thereof for one or more types of transmission.

Further, in the example of FIG. 4, the UE and base station may prioritize RSS 415 when scheduling conflicts are present for an MPDCCH control 445 signal, DMRS 450 transmissions if configured behind RSS 415, portions of broadcast PDSCH 455 transmissions (e.g., non-control portions), unicast PDSCH 460, or combinations thereof. In such cases, the base station may puncture, delay, or rate-match the lower priority transmissions 410 in the event of a scheduling conflict with RSS 415. A UE that is able to process the RSS 215 may be configured to implement transmission prioritization rules 400 and may determine that a lower priority transmission is punctured, rate matched, or delayed, either through implicit determination based on a resource allocation and transmission prioritization rules 400, an explicit indication of transmission prioritization rules 400 (e.g., provided by the base station in RRC signaling), or combinations thereof for one or more types of transmission. In some cases, the base station may not transmit one or more of the lower priority transmissions 410, or portions thereof, when a scheduling conflict with RSS 415 is present. In such cases, UEs that are able to process RSS 415 may identify the RSS and take action accordingly, and UEs that are not able to process RSS may depend on the base station scheduling or may monitor each subframe as usual.

Figure 5:
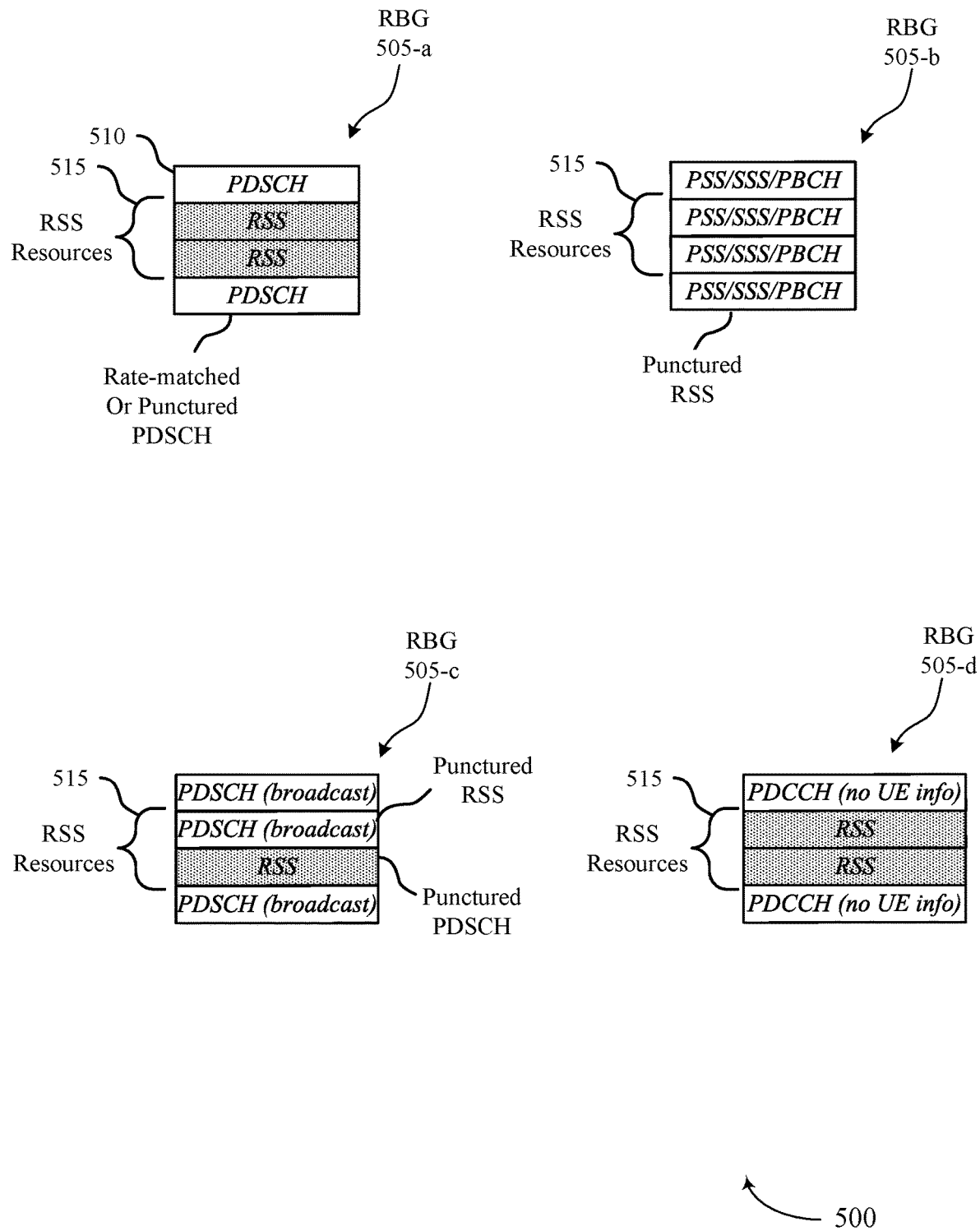
FIG. 5 illustrates an example of an RSS transmission with other concurrent transmissions that supports resynchronization signal transmission in wireless communications in accordance with aspects of the present disclosure.

FIG. 5 illustrates examples of RSS transmissions with other concurrent transmissions 500, illustrating examples of puncturing, rate matching, or delay of such transmissions based on the implementation of one or more sets of prioritization rules, which may support resynchronization signal transmission in wireless communications in accordance with various aspects of the present disclosure. In some examples, RSS transmission with other concurrent transmissions 500 may be implemented by aspects of wireless communications system 100. FIG. 5 illustrates some exemplary interactions with RSS 515 and one or more other concurrent transmissions. It is to be understood that these examples are for illustration and discussion only and do not limit the scope of the disclosure. In this example, a number of RBGs 505 may have corresponding PRBs 510. In this example, RSS 515 resources may be configured occupy two PRBs 510.

In a first exemplary RBG 505-*a*, PDSCH transmissions may overlap with RSS 515. In the case of PDSCH interactions, a base station and UE may be configured to implement a set of prioritization rules for the transmissions. In some cases, the set of prioritization rules may provide that, for UEs that are able to process RSS and in the case of unicast PDSCH, the base station will not schedule any UE in the RBG(s) where the RSS resides, irrespective of UE mode, SIB1 and/or SIB1-BR information, and the like. In such cases, the UE may receive and decode the RSS 515 only.

In other examples, both SIB1 and SIB1-BR may include information on the RSS 515, and thus, any UE that can process RSS 515 may be informed of the RSS information irrespective of whether it is operating in an MBB or CE mode. In such cases, the base station may rate-match around RSS 515 for signaling PDSCH (e.g., for transmitting in MBB mode). In cases where the UE may be in a CE mode, the set of prioritization rules may depend upon a type of CE mode, such as CE mode A or CE mode B, in which CE mode B may provide enhanced coverage enhancement relative to CE mode A (e.g., via additional repetitions, etc.). In such cases, a UE in CE mode A may receive, and the base station may transmit, the PDSCH that is rate-matched around the RSS 515. In cases where the UE is operating in CE mode B, the base station may puncture the PDSCH by RSS 515, may rate-match the PDSCH around RSS 515, or may not schedule PDSCH in the RBG(s) for UEs in CE mode B. In some cases, the UE and base station may select and implement a particular set of prioritization rules based on the CE mode of the UE. In cases where puncturing is used, such a technique may enable carrier frequency offset (CFO) estimation and symbol-level combining across PDSCH repetitions, and the UE may determine that the PDSCH is punctured.

In other cases, the RSS information may be only signaled in SIB1-BR, and thus only narrowband UEs may be identify the RSS 215. In such cases, for non-CE mode operation, the base station may puncture the PDSCH by the RSS, or not schedule PDSCH in the RBG(s) for the UE that contain the RSS 515. In some examples, for a UE operation in CE mode A/B, the base station may employ the operations/choices as discussed above for the different CE mode operation.

In some cases, a set of prioritization rules selected by a base station may be based at least in part on a Transmission Mode (TM) for the UE. For example, a UE may operate in a CRS-based TM or DMRS-based TM, and the base station may select a different set of prioritization rules based on the particular TM. In some cases, the CRS transmission mode may have a CRS that is monitored by a number of different UEs, and the CRS may puncture an RSS transmission, whereas a DMRS may be UE-specific and RSS may puncture a DMRS. In some cases, the UE may explicitly or implicitly signal to the base station that it can process the RSS 215, which may be used by the base station in selecting a set of prioritization rules for communicating overlapping transmissions. In some cases, explicit signaling may be provided through a dedicated indication to the base station provided by a UE. Implicit signaling may allow the base station to infer that the UE is capable of processing the RSS 515, such as through a capability or category indication that the UE may provide to the base station.

In cases where a UE is not able to process the RSS 515, the base station may puncture PDSCH with the RSS, or may not schedule PDSCH transmissions in RBG(s) containing RSS 515. In the puncturing case, such a UE may not identify this puncturing.

In the example of FIG. 5, another exemplary RBG 505-*b* may include one or more of a PSS, SSS, or PBCH transmission. In some cases, such transmissions may be prioritized ahead of RSS 515, and may puncture RSS 515. In some cases, when PSS, SSS, or PBCH transmissions are scheduled in a same RBG as RSS, the RSS 515 may be not be transmitted in RBG 505-*b* (e.g., RSS 515 may be delayed or dropped for RBG 505-*b*). A UE that is able to process the RSS 515 may understand that the RSS 515 is delayed or dropped and adjust its reception and decoding of the RSS 515 to accommodate the delay.

In some cases, one or more broadcast PDSCH transmissions may be transmitted by a base station. An example of such broadcast PDSCH is illustrated in exemplary RBG 505-*c*. In such cases, for some parts of the broadcast PDSCH, the base station may prioritize it over the RSS 515, such that when RSS 515 is scheduled to collide with these parts of the broadcast PDSCH, the RSS is either punctured or delayed. Such parts of the broadcast PDSCH may include control information (e.g., a SIB), for example. Similarly, for parts of a PBCH that include system information (e.g., a SIB), the base station may prioritize that part of the PBCH over RSS.

For other parts of the broadcast PDSCH (e.g., parts that do not include system information), the base station may prioritize the RSS 515 over the broadcast PDSCH, such that when the RSS 515 is scheduled to collide with these parts of the broadcast PDSCH, the broadcast PDSCH is punctured by the RSS, or the broadcast PDSCH is rescheduled.

Continuing with the example of FIG. 5, PDCCH transmissions (e.g., MPDCCH transmissions), such as transmitted in RBG 505-*d*, may be scheduled to collide with RSS 515. In some cases, in the event of such a scheduling conflict the base station may prioritize RSS over the PDCCH transmission and may not embed any control information for the UE in those PDCCH candidates. Thus, the UE may not attempt to decode control information from such an RBG 505-*d*. In other cases, the base station may puncture those PDCCH candidates with the RSS. Whether the base station does not schedule control information in the RBG or punctures the PDCCH candidates with the RSS may be determined, in some examples, based on whether the UE can process the RSS, the mode of operation of the UE (e.g., MBB or CE-mode), whether RSS information is signaled only in SIB1-BR or is common to SIB1 and SIB1-BR, or combinations thereof. In other cases, a base station may prioritize PDCCH transmissions over RSS.

In some cases, the set of prioritization rules for implementation may be preconfigured or signaled to the UE when a connection is established. In the event that the base station does not schedule PDCCH in an RBG with RSS 515, a UE that can process RSS 515 may skip decoding the PDCCH candidates that overlap with RSS. Other UEs may continue to attempt to decode PDCCH candidates in such RBGs, even though these candidates will not contain any information for the UE. In cases where PDCCH is punctured, the UE may read all PDCCH candidates irrespective of whether it can process the RSS, and UEs that can process the RSS and know its location may identify the puncturing and decode the candidate accordingly.

In some cases, one or more CRS transmissions may be scheduled to collide with RSS 515. In such cases, the CRS may puncture the RSS 515. In some cases, CRS muting techniques may be used in which a CRS may not be transmitted in one or more RBGs, and in such cases the base station may transmit the RSS 515 in such an RBG. A UE that identifies the CRS muting configuration and that can process RSS may attempt to receive and decode the RSS accordingly. Furthermore, in some cases one or more PRS transmissions may be scheduled to collide with RSS 515. A base station usually schedules PRS to avoid subframes with PSS/SSS/PBCH, however due to the length of RSS 515 such avoidance may not be possible. A PRS is a special signal that may provide "empty resource elements" that may be used by the UE to measure the neighbor cells. Thus, in such cases the RSS 515 may be dropped either for the subframe or for that particular PRB. RSS 515 may similarly be dropped for a subframe or a particular PRB when RSS 515 overlaps with a PSS, SSS, or PBCH transmission or a transmission carrying system information.

Figure 6:
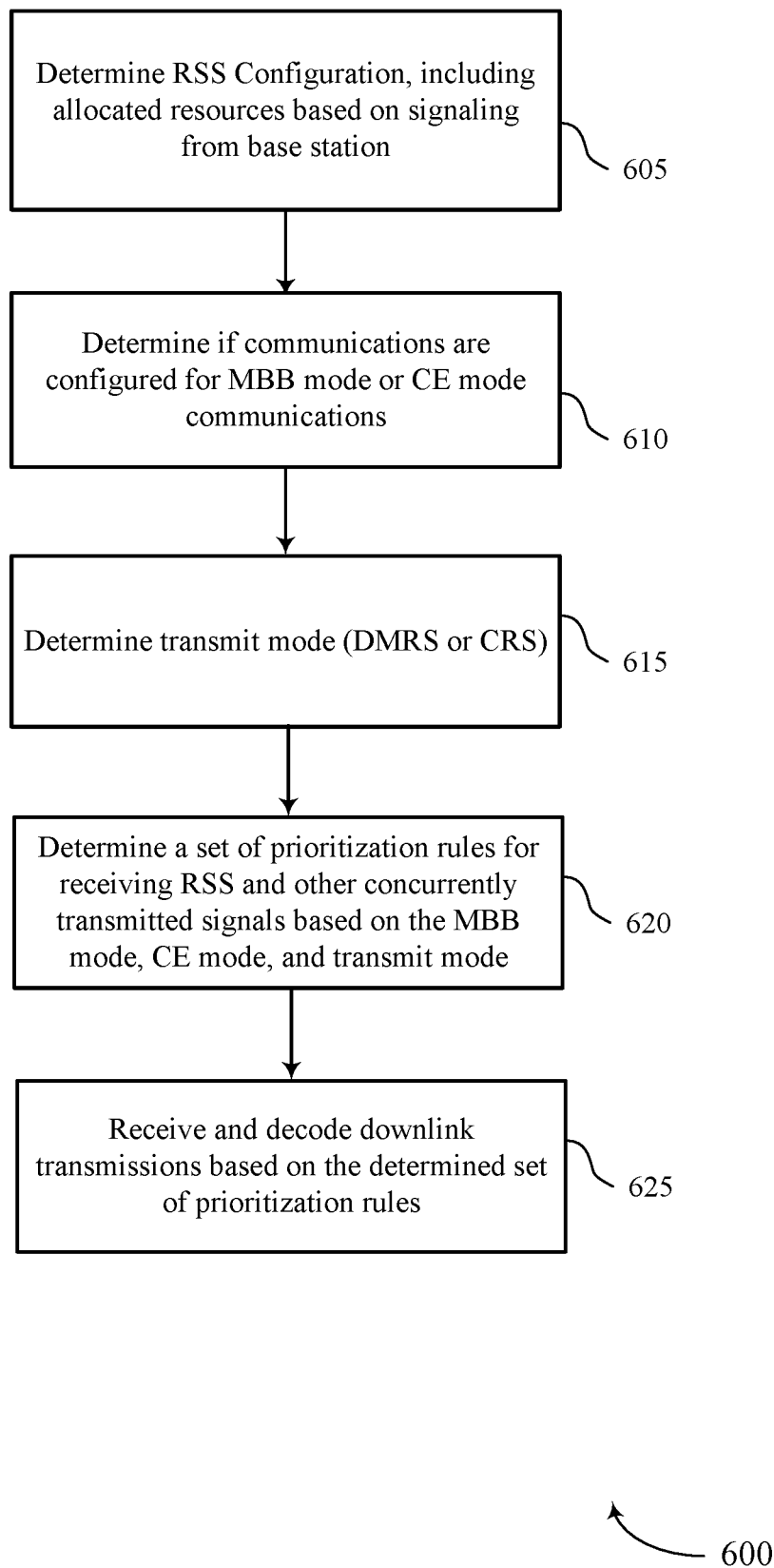
FIG. 6 illustrates an example of a method that supports resynchronization signal transmission in wireless communications in accordance with aspects of the present disclosure.

FIG. 6 shows a flowchart illustrating a method 600 that supports resynchronization signal transmission in wireless communications in accordance with various aspects of the present disclosure. The operations of method 600 may be implemented by a UE 115 or its components as described herein. For example, the operations of method 600 may be performed by a UE communications manager as described below. In some examples, a UE 115 may execute a set of codes to control the functional elements of the device to perform the functions described below. Additionally or alternatively, the UE 115 may perform aspects of the functions described below using special-purpose hardware.

At 605 the UE 115 may determine an RSS configuration, including allocated resources, based on signaling from base station. In some cases, the RSS configuration may be provided in a SIB. In some cases, the UE 115 may receive an indication of a periodicity of the RSS, a length of the RSS, a frequency offset and/or a frequency location for the RSS, or an PRB or narrowband index location of the RSS. Additionally or alternatively, the SIB may indicate a transmit power for the RSS, a bandwidth of the RSS, a hopping pattern for the RSS, a multiplicative factor for the RSS periodicity, or combinations thereof.

At 610 the UE 115 may determine if communications are configured for MBB mode or CE mode communications. Such a determination may be made based on a configured mode for communications through a connection establishment procedure. In some cases, CE mode communications may be initiated based on a channel quality between the UE and base station that may indicate that power boosting or repetitions associated with CE mode may be used to enhance reliability of communications. In some cases, multiple CE modes may be available, such as CE mode A and CE mode B, in which one of the CE modes may provide increased power boosting, increased repetitions of transmissions, or combinations thereof. In some cases, the MBB or CE mode of communications may indicate that a different set of prioritization rules associated with receiving RSS and other concurrent transmissions may be utilized.

At 615 the UE 115 may determine transmit mode (DMRS or CRS) for communications. CRS transmit modes may provide that a CRS is used by multiple UEs for channel estimation, and DMRS transmit modes may provide a DMRS that is unique to a UE. Such transmit modes may be a determined based on a configured mode in a connection establishment procedure. In some cases, the transmit mode of communications may indicate that a different set of rules associated with receiving RSS and other concurrent transmissions may be utilized.

At 620 the UE 115 may determine a set of prioritization rules for receiving an RSS and other concurrently transmitted signals based on the MBB mode, CE mode, and transmit mode. As discussed above, certain rules for which transmissions are to be monitored and decoded may be dependent upon one or more of the MBB mode, transmit mode, or combinations thereof. In some cases, different sets or subsets of prioritization rules may be configured as discussed above based on the one or more different modes of operation at the UE. Both the UE and the base station may thus select the same corresponding prioritization rules for transmissions in which RSS is scheduled to collide with one or more other transmissions.

At 625 the UE 115 may receive and decode downlink transmissions based on the determined set of prioritization rules. In some cases, the UE 115 may buffer signals for an RBG, and may attempt to decode the received signals based on the determined set of prioritization rules.

Figure 7:
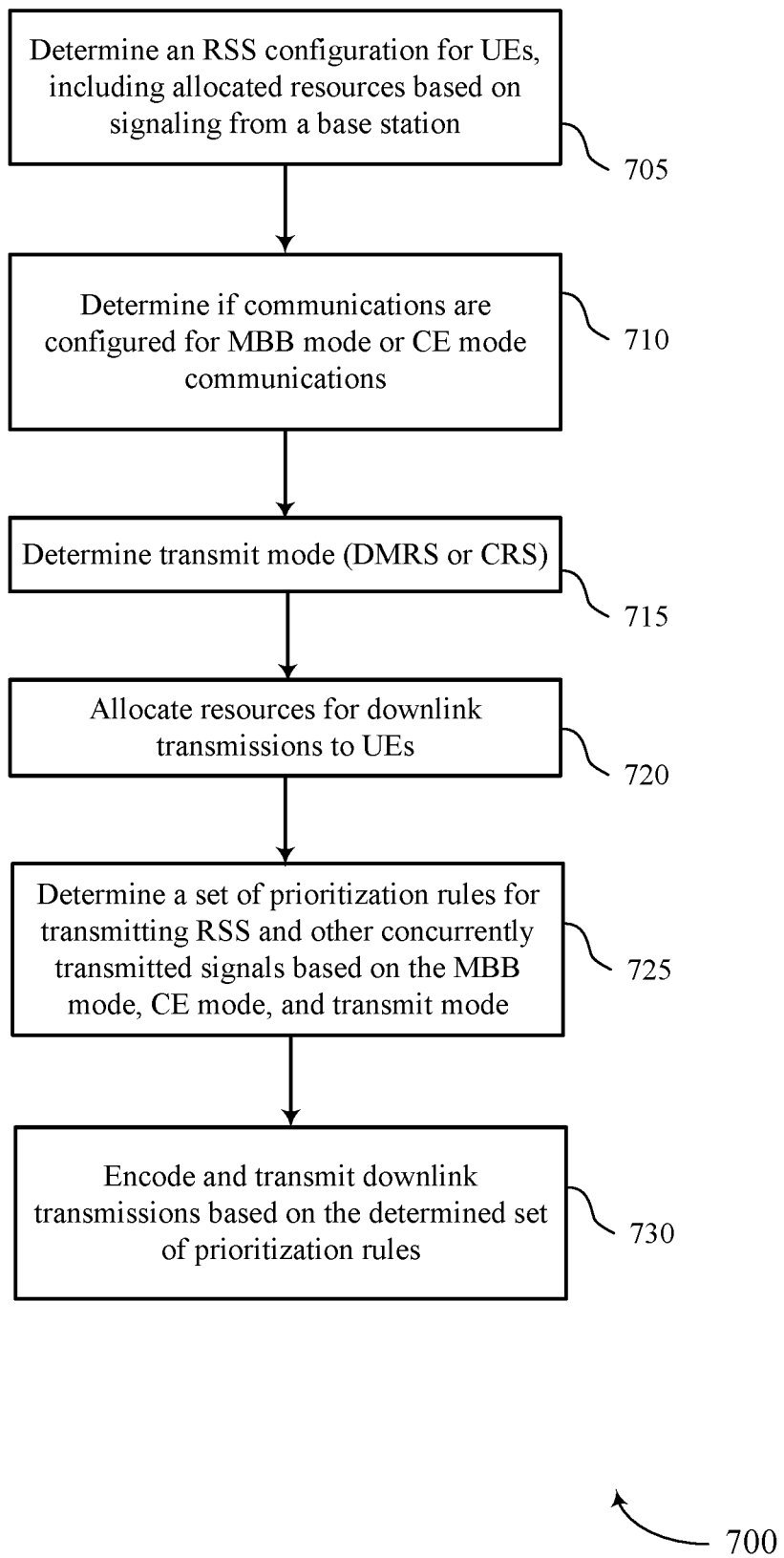
FIG. 7 illustrates an example of a method that supports resynchronization signal transmission in wireless communications in accordance with aspects of the present disclosure.

FIG. 7 shows a flowchart illustrating a method 700 that supports resynchronization signal transmission in wireless communications in accordance with various aspects of the present disclosure. that supports resynchronization signal transmission in wireless communications in accordance with various aspects of the present disclosure. The operations of method 700 may be implemented by a base station 105 or its components as described herein. For example, the operations of method 700 may be performed by a base station communications manager as described below. In some examples, a base station 105 may execute a set of codes to control the functional elements of the device to perform the functions described below. Additionally or alternatively, the base station 105 may perform aspects of the functions described below using special-purpose hardware.

At 705 the base station 105 may determine an RSS configuration for UEs, including allocated resources based on signaling from a base station. In some cases, the RSS configuration may be provided in a SIB. In some cases, the UE 115 may receive an indication of a periodicity of the RSS, a length of the RSS, a frequency offset and/or a frequency location for the RSS, or an PRB or narrowband index location of the RSS. Additionally or alternatively, the SIB may indicate a transmit power for the RSS, a bandwidth of the RSS, a hopping pattern for the RSS, a multiplicative factor for the RSS periodicity, or combinations thereof.

At 710 the base station 105 may determine if communications are configured for MBB mode or CE mode communications. Such a determination may be made based on a configured mode for communications through a connection establishment procedure. In some cases, CE mode communications may be initiated based on a channel quality between the UE and base station that may indicate that power boosting or repetitions associated with CE mode may be used to enhance reliability of communications. In some cases, multiple CE modes may be available, such as CE mode A and CE mode B, in which one of the CE modes may provide increased power boosting, increased repetitions of transmissions, or combinations thereof. In some cases, the MBB or CE mode of communications may indicate that a different set of rules associated with receiving RSS and other concurrent transmissions may be utilized.

At 715 the base station 105 may determine a transmit mode (DMRS or CRS) for communications with the UE. CRS transmit modes may provide a CRS that is used by multiple UEs for channel estimation, and DMRS transmit modes may provide a DMRS that is unique to a UE. Such transmit modes may be a determined based on a configured mode in a connection establishment procedure. In some cases, the transmit mode of communications may indicate that a different set of rules associated with receiving RSS and other concurrent transmissions may be utilized.

At 720 the base station 105 may allocate resources for downlink transmissions to UEs. Resource allocation may include allocation of resources for PDSCH transmissions, PDCCH transmissions, among others. In some case, various reference signal transmissions may also be configured for certain resources. The base station may transmit a resource allocation to a UE via, for example, downlink control information (DCI). In some cases, the resource allocation may result in one or more transmissions overlapping with a configured RSS.

At 725 the base station 105 may determine a set or prioritization rules for transmitting RSS and other concurrently transmitted signals based on the MBB mode, CE mode, and transmit mode. As discussed above, certain rules for which transmissions are to be encoded and transmitted may be dependent upon one or more of the MBB mode, transmit mode, or combinations thereof. In some cases, different sets or subsets of prioritization rules may be configured as discussed above based on the one or more different modes of operation at the UE. Both the UE and the base station may thus select the same corresponding prioritization rules for transmissions in which RSS is scheduled to collide with one or more other transmissions.

At 730 the base station 105 may encode and transmit downlink transmissions based on the determined set or prioritization rules. The encoded and transmitted signals may include the punctured signals, rate-matched signals, and the like, according to the determined set of prioritization rules.

Figure 8:
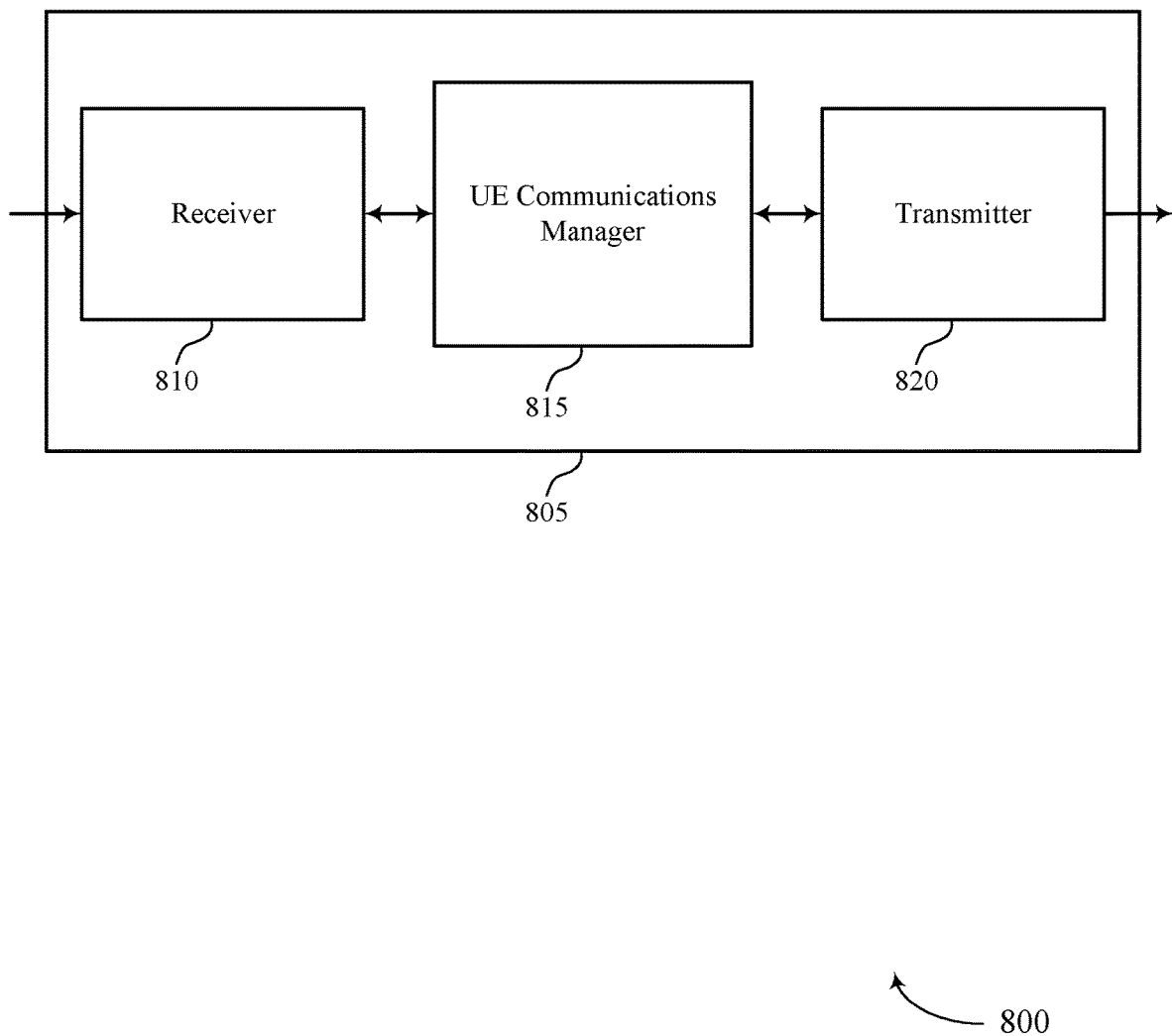
FIGS. 8 through 10 show block diagrams of a device that supports resynchronization signal transmission in wireless communications in accordance with aspects of the present disclosure.

FIG. 8 shows a block diagram 800 of a wireless device 805 that supports resynchronization signal transmission in wireless communications in accordance with aspects of the present disclosure. Wireless device 805 may be an example of aspects of a user equipment (UE) 115 as described herein. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to resynchronization signal transmission in wireless communications, etc.). Information may be passed on to other components of the device. The receiver 810 may be an example of aspects of the transceiver 1135 described with reference to FIG. 11. The receiver 810 may utilize a single antenna or a set of antennas.

UE communications manager 815 may be an example of aspects of the UE communications manager 1115 described with reference to FIG. 11.

UE communications manager 815 and/or at least some of its various sub-components may be implemented in hardware, software executed by a processor, firmware, or any combination thereof. If implemented in software executed by a processor, the functions of the UE communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 815 and/or at least some of its various sub-components may be physically located at various positions, including being distributed such that portions of functions are implemented at different physical locations by one or more physical devices. In some examples, UE communications manager 815 and/or at least some of its various sub-components may be a separate and distinct component in accordance with various aspects of the present disclosure. In other examples, UE communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some cases, UE communications manager 815 may transmit, from a UE, an indication to a base station that the UE is capable of processing a RSS, identify, at the UE, a set of prioritization rules for receiving RSS transmissions and one or more other concurrent transmissions from the base station, and receive, responsive to the indication, the RSS and one or more other concurrent transmissions from the base station based on the identified set of prioritization rules.

In some cases, UE communications manager 815 may transmit, from a UE, an indication to a base station that the UE is capable of processing a RSS, determine, at the UE, that an RSS transmission is scheduled for first wireless resources that at least partially overlap with second wireless resources scheduled for another transmission of the one or more transmission types, and receive, from the base station, the RSS transmission or the other transmission, or any combination thereof, based on one or more prioritization rules that prioritize one or more transmission types relative to the RSS.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
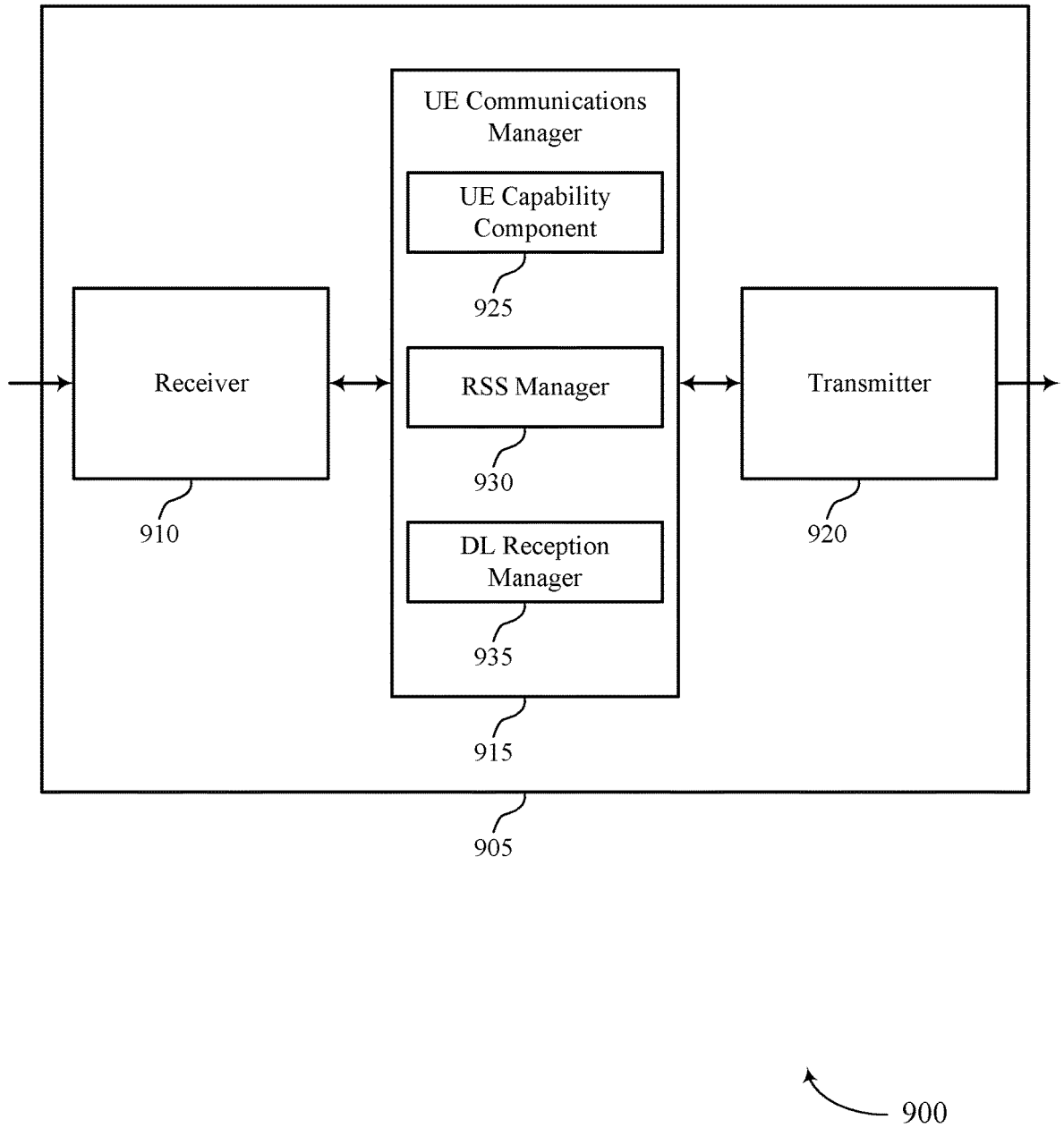

FIG. 9 shows a block diagram 900 of a wireless device 905 that supports resynchronization signal transmission in wireless communications in accordance with aspects of the present disclosure. Wireless device 905 may be an example of aspects of a wireless device 805 or a UE 115 as described with reference to FIG. 8. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to resynchronization signal transmission in wireless communications, etc.). Information may be passed on to other components of the device. The receiver 910 may be an example of aspects of the transceiver 1135 described with reference to FIG. 11. The receiver 910 may utilize a single antenna or a set of antennas.

UE communications manager 915 may be an example of aspects of the UE communications manager 1115 described with reference to FIG. 11.

UE communications manager 915 may also include UE capability component 925, RSS manager 930, and downlink (DL) reception manager 935.

UE capability component 925 may transmit an indication to a base station that the UE is capable of processing an RSS. In some cases, the indication to the base station that the UE is capable of processing the RSS is an explicit indication transmitted to the base station. In some cases, such capability may be implicitly determined based on other indications provided by the UE, such as a UE category or capability indication.

RSS manager 930 may identify a set of prioritization rules for receiving RSS transmissions and one or more other concurrent transmissions from the base station. In some cases, RSS manager 930 may determine, based on the identified set of prioritization rules, that the RSS is punctured or delayed for at least a first portion of the RSS that overlaps with a first transmission of the one or more other downlink transmissions from the base station. In some cases, RSS manager 930 may identify the set of prioritization rules for receiving the RSS and the one or more other concurrent transmissions based on an identified coverage enhancement mode. In some cases, RSS manager 930 may, identify that wireless resources for a broadcast transmission are at least partially overlapping with wireless resources for the RSS (e.g., may determine that an RSS transmission is scheduled for first wireless resources that at least partially overlap with second wireless resources scheduled for another transmission of one or more transmission types). In some cases, RSS manager 930 may determine that at least a first portion of the broadcast transmission is to be included and a first portion of the RSS is not to be included in a first portion of the overlapping wireless resources, and that at least a second portion of the RSS is to be included and a second portion of the broadcast transmission is not to be transmitted in a second portion of the overlapping wireless resources. In some cases, the set of prioritization rules is based on a prioritization for the one or more other concurrent transmissions relative to the RSS. In some cases, the set of prioritization rules for receiving the RSS transmissions and the one or more other concurrent transmissions is based on whether the UE is in a CRS transmission mode or a DMRS transmission mode.

DL reception manager 935 may receive, responsive to the indication, the RSS and one or more other concurrent transmissions from the base station based on the identified set of prioritization rules. In some cases, DL reception manager 935 may receive, from the base station, the RSS transmission or the other transmission, or any combination thereof, based on one or more prioritization rules that prioritize the one or more transmission types relative to the RSS. In some cases, DL reception manager 935 may decode a remaining portion of the wireless resources for the RSS that are not punctured. In some cases, DL reception manager 935 may receive the RSS and a broadcast transmission based on the determining and decode only control channel transmissions of the broadcast transmission that are non-overlapping with the wireless resources for the RSS. In some cases, DL reception manager 935 may monitor for the first transmission in wireless resources associated with the first portion of the RSS and decode a remaining portion of the wireless resources for control channel transmissions. In some cases, DL reception manager 935 may identify that at least a portion of wireless resources for the RSS are punctured based on the portion of wireless resources overlapping with wireless resources for one or more of a primary synchronization signal (PSS), a secondary synchronization signal (SSS) or a PBCH signal, and receive one or more of the PSS, SSS, or PBCH signals via the identified portion of the wireless resources.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
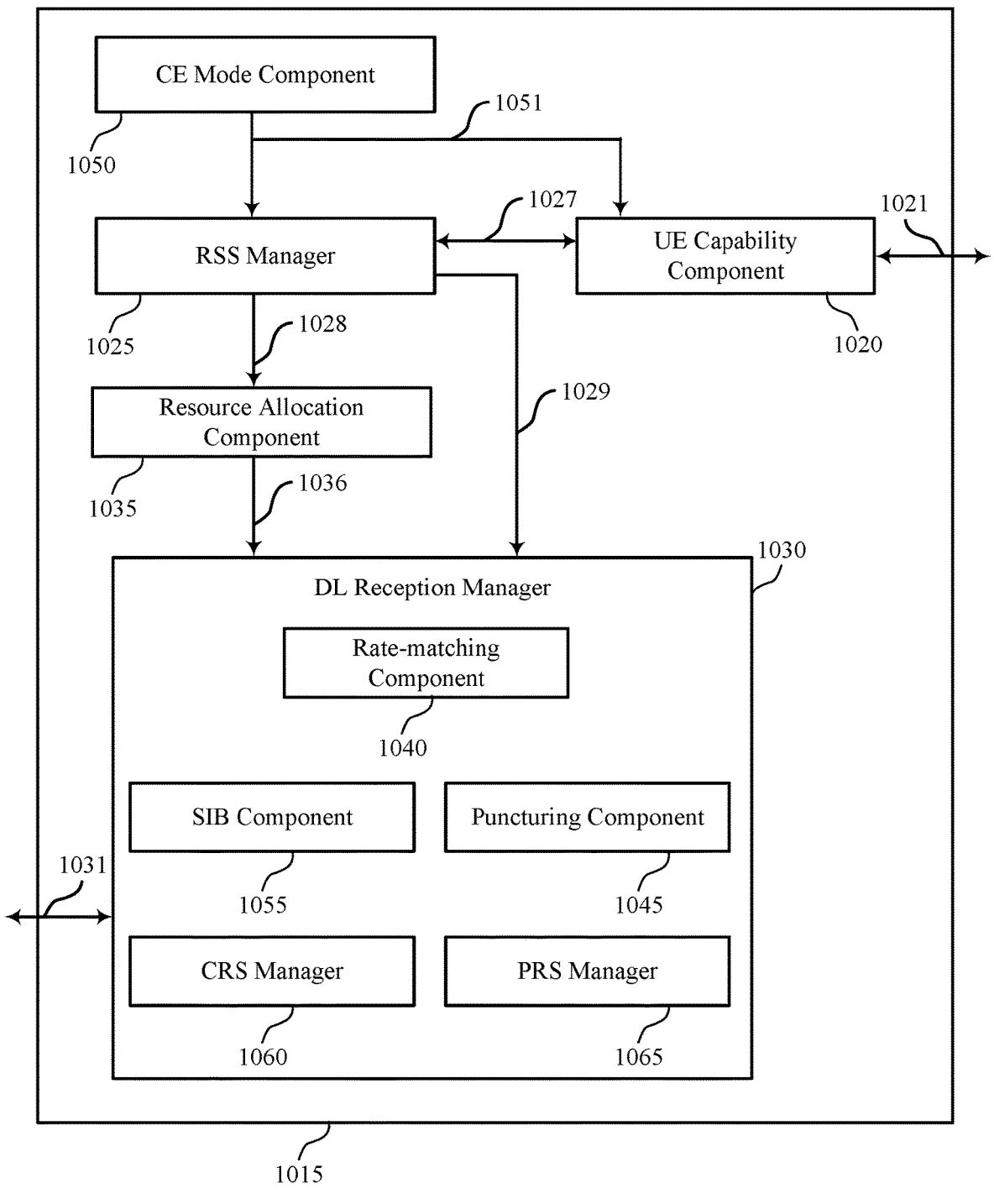

FIG. 10 shows a block diagram 1000 of a UE communications manager 1015 that supports resynchronization signal transmission in wireless communications in accordance with aspects of the present disclosure. The UE communications manager 1015 may be an example of aspects of a UE communications manager 815, a UE communications manager 915, or a UE communications manager 1115 described with reference to FIGS. 8, 9, and 11. The UE communications manager 1015 may include UE capability component 1020, RSS manager 1025, DL reception manager 1030, resource allocation component 1035, rate-matching component 1040, puncturing component 1045, CE mode component 1050, SIB component 1055, CRS manager 1060, and PRS manager 1065. Each of these modules may communicate, directly or indirectly, with one another (e.g., via one or more buses).

RSS manager 1025 may identify a set of prioritization rules for receiving RSS transmissions and one or more other concurrent transmissions from the base station. In some cases, RSS manager 1025 may determine, based on the identified set of prioritization rules, that the RSS is punctured or delayed for at least a first portion of the RSS that overlaps with a first transmission of the one or more other downlink transmissions from the base station. In some cases, RSS manager 1025 may identify the set of prioritization rules for receiving the RSS and the one or more other concurrent transmissions based on an identified coverage enhancement mode. In some cases, RSS manager 1025 may, identify that wireless resources for a broadcast transmission are at least partially overlapping with wireless resources for the RSS, and determine that at least a first portion of the broadcast transmission is to be included and a first portion of the RSS is not to be included in a first portion of the overlapping wireless resources, and that at least a second portion of the RSS is to be included and a second portion of the broadcast transmission is not to be transmitted in a second portion of the overlapping wireless resources. In some cases, the set of prioritization rules is based on a prioritization for the one or more other concurrent transmissions relative to the RSS. In some cases, the set of prioritization rules for receiving the RSS transmissions and the one or more other concurrent transmissions is based on whether the UE is in a CRS transmission mode or a DMRS transmission mode.

RSS manager 1025 may also determine, at the UE, that an RSS transmission is scheduled for first wireless resources that at least partially overlap with second wireless resources scheduled for another transmission of the one or more transmission types. In some examples, RSS manager 1025 may determine, based on the one or more prioritization rules and determining that the first wireless resources overlap with the second wireless resources, that a portion of the downlink shared channel transmission is punctured by the RSS transmission. In some examples, RSS manager 1025 may determine, based on the one or more prioritization rules and determining that the first wireless resources overlap with the second wireless resources, that a portion of the control channel transmission is punctured by the RSS transmission. In some examples, RSS manager 1025 may determine that the RSS is punctured by the other transmission or delayed based on the one or more prioritization rules.

In some cases, RSS manager 1025 may send an RSS indicator 1027 to UE capability component 1020. RSS indicator 1027 may be used to indicate that a UE is configured and enabled to receive RSS. RSS manager 1025 may also send RSS information 1029 to DL reception manager 1030. RSS information 1029 may include a set of prioritization rules for receiving conflicting RSS and other transmissions, such as a set of prioritization rules. RSS manager 1025 may also send RSS scheduling information 1028 to resource allocation component 1035. RSS scheduling information 1028 may indicate subsequent wireless resources scheduled for subsequent RSS transmissions.

CE mode component 1050 may identify a coverage enhancement mode of the UE. In some cases, CE mode component 1050 transmits a CE mode indicator 1051 to UE capability component 1020 and/or RSS manager 1025. In some cases, RSS manager 1025 updates a set of prioritization rules for receiving conflicting RSS and other transmissions based on the operating mode indicated by CE mode indicator 1051—e.g., reordering a set of prioritization rules.

UE capability component 1020 may transmit, from a UE, an indication to a base station that the UE is capable of processing an RSS. In some cases, the indication to the base station that the UE is capable of processing the RSS is an explicit indication transmitted to the base station.

In some cases, UE capability component 1020 receives RSS indicator 1027 from RSS manager 1025 and transmits an RSS capability indicator 1021 to a base station based on determining that an RSS mode is enabled at the UE.

Resource allocation component 1035 may identify wireless resources for control channel transmissions that are at least partially overlapping with wireless resources for the RSS. In some cases, the RSS is transmitted in wireless resources in a frequency domain that are indicated relative to a resource block group (RBG) or relative to a narrowband operating bandwidth of the UE.

In some cases, resource allocation component 1035 identifies wireless resources scheduled for subsequent RSS transmissions based on RSS scheduling information 1028. After identifying that wireless resources scheduled for an RSS transmission overlap with wireless resources scheduled for one or more other transmissions, resource allocation component 1035 may send conflict indicator 1036 to DL reception manager 1030. Conflict indicator 1036 may indicate which wireless resources are scheduled for conflicting RSS and other transmissions.

DL reception manager 1030 may receive, responsive to the indication, the RSS and one or more other concurrent transmissions from the base station based on the identified set of prioritization rules. In some cases, DL reception manager 1030 may decode a remaining portion of the wireless resources for the RSS that are not punctured. In some cases, DL reception manager 1030 may receive the RSS and a broadcast transmission based on the determining and decode only control channel transmissions of the broadcast transmission that are non-overlapping with the wireless resources for the RSS. In some cases, DL reception manager 1030 may monitor for the first transmission in wireless resources associated with the first portion of the RSS and decode a remaining portion of the wireless resources for control channel transmissions. In some cases, DL reception manager 1030 may identify that at least a portion of wireless resources for the RSS are punctured based on the portion of wireless resources overlapping with wireless resources for one or more of a primary synchronization signal (PSS), a secondary synchronization signal (SSS) or a PBCH signal, and receive one or more of the PSS, SSS, or PBCH signals via the identified portion of the wireless resources.

DL reception manager 1030 may also receive, from the base station, the RSS transmission or the other transmission, or any combination thereof, based on one or more prioritization rules that prioritize one or more transmission types relative to the RSS. In some examples, DL reception manager 1030 may receive, in the PRB or subframe, the other transmission and not the RSS transmission over the second wireless resources. In some cases, the other transmission includes a PSS, SSS, or PBCH transmission, or any combination thereof. In some cases, the other transmission includes a PBCH transmission carrying system information. In some cases, the other transmission includes a PDSCH transmission carrying system information.

In some cases, the other transmission includes a downlink shared channel transmission and DL reception manager 1030 may receive the RSS transmission over the first wireless resources and a non-punctured portion of the downlink shared channel transmission over a subset of the second wireless resources. In some examples, DL reception manager 1030 may decode the non-punctured portion of the downlink shared channel transmission.

In some cases, the other transmission includes a control channel transmission and DL reception manager 1030 may receive the RSS transmission over the first wireless resources and a non-punctured portion of the control channel transmission over a subset of the second wireless resources. In some examples, DL reception manager 1030 may decode the non-punctured portion of the control channel transmission. In some examples, DL reception manager 1030 may refrain from decoding control channel candidates associated with the second wireless resources based on the one or more prioritization rules and determining that the first wireless resources at least partially overlap with the second wireless resources.

In some examples, DL reception manager 1030 may monitor for the RSS transmission in the first wireless resources based on the one or more prioritization rules. In some examples, DL reception manager 1030 may monitor for the other transmission in the second wireless resources.

In some cases, DL reception manager 1030 receives conflict indicator 1036 and RSS information 1029. DL reception manager 1030 may identify wireless resources scheduled for an overlapping RSS and another transmission based on conflict indicator 1036 and may determine whether to receive the RSS transmission, the other transmission, or some combination thereof, based on RSS information 1029. For example, DL reception manager may determine to receive the RSS transmission based on determining that the RSS transmission is prioritized over the other transmission, or vice versa. DL reception manager 1030 may also receive transmission 1031. Transmission 1031 may include an RSS transmission, another transmission, a punctured RSS transmission, a punctured other transmission, or any combination thereof. DL reception manager 1030 may receive transmission 1031 based on conflict indicator 1036 and RSS information 1029—e.g., DL reception manager 1030 may determine that a subframe including transmission 1031 contains conflicted resources and may receive the other transmission and not the RSS transmission based on the other transmission having a higher priority than the RSS transmission.

DL reception manager 1030 may include rate-matching component 1040, puncturing component 1045, SIB component 1055, CRS manager 1060, and PRS manager 1065. As suggested above, DL reception manager 1030 may receive transmission 1031 using one of these components based on identifying that an RSS transmission is scheduled to conflict with another transmission and a type of the other transmission. For example, DL reception manager 1030 may receive transmission 1031 using PRS manager 1065 based on determining that a PRS transmission is scheduled to use resources allocated to RSS.

Rate-matching component 1040 may receive a downlink shared channel transmission that is rate-matched around the RSS. In some cases, the rate-matched portion of a reception may be provided for decoding without the RSS portion.

Puncturing component 1045 may determine that a portion of a concurrent downlink shared channel transmission that overlaps with the RSS is punctured and decode a non-punctured portion of the concurrent downlink shared channel transmission.

SIB component 1055 may identify a SIB and information contained therein. In some cases, the set of prioritization rules for receiving the RSS transmissions and the one or more other concurrent transmissions is based on a type of SIB signal that includes RSS information. In some cases, the types of SIB include a SIB1 for non-MTC/CE-mode UEs and a SIB1-BR for eMTC/CE-mode UEs.

CRS manager 1060 may identify that at least a portion of wireless resources for the RSS are punctured based on the portion of wireless resources overlapping with wireless resources for CRS transmissions, receive the CRS transmissions via the wireless resources for the CRS transmissions, identify a subset of the overlapping resources subject to CRS muting, and receive the RSS transmissions via the subset of the overlapping resources.

PRS manager 1065 may identify that at least a portion of wireless resources for the RSS are punctured based on overlapping with wireless resources for PRS transmissions, decode a remaining portion of the wireless resources for the RSS, and receive the PRS transmissions via the wireless resources for the PRS transmissions.

Figure 11:
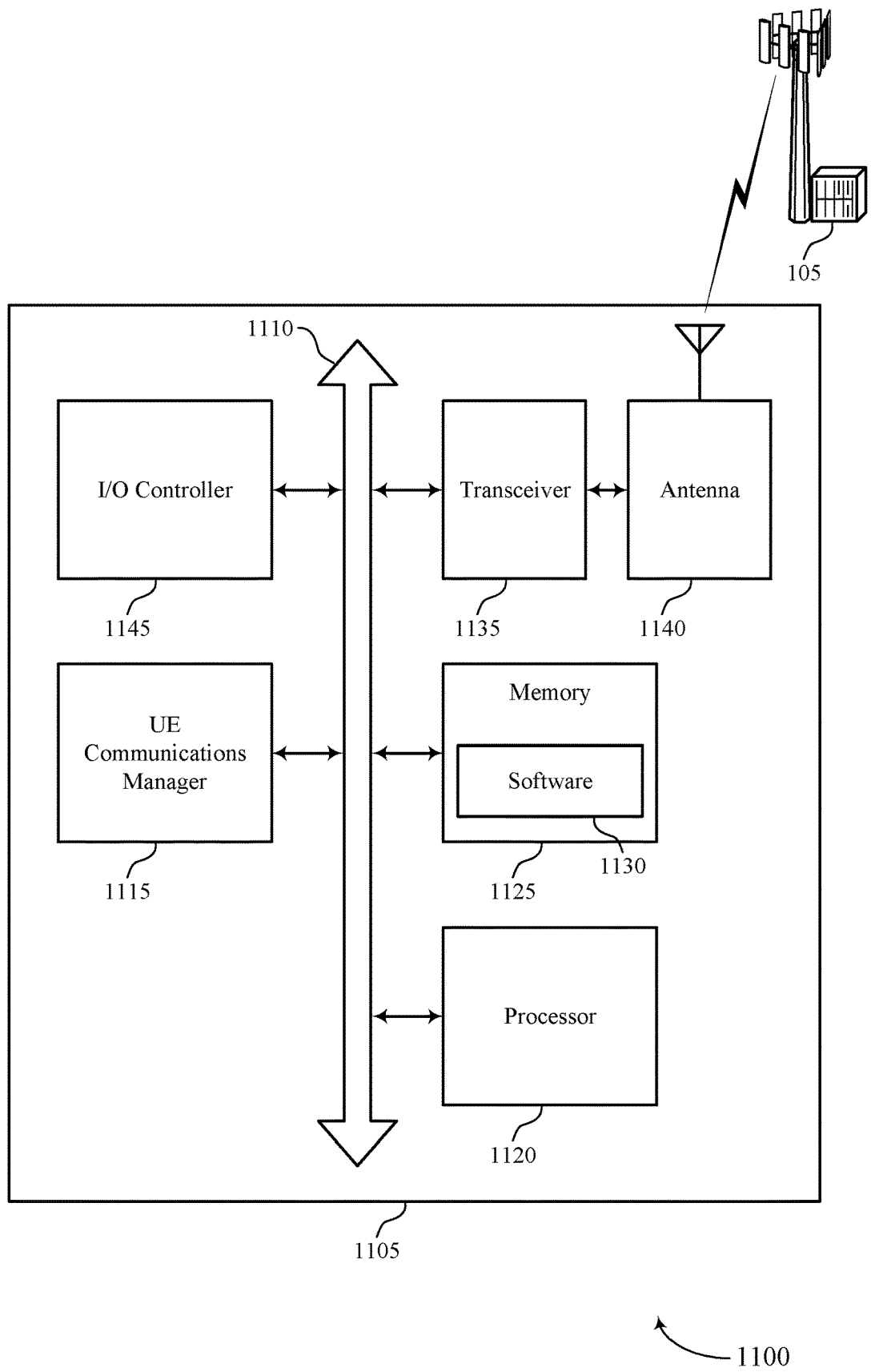
FIG. 11 illustrates a block diagram of a system including a UE that supports resynchronization signal transmission in wireless communications in accordance with aspects of the present disclosure.

FIG. 11 shows a diagram of a system 1100 including a device 1105 that supports resynchronization signal transmission in wireless communications in accordance with aspects of the present disclosure. Device 1105 may be an example of or include the components of wireless device 805, wireless device 905, or a UE 115 as described above, e.g., with reference to FIGS. 8 and 9. Device 1105 may include components for bi-directional voice and data communications including components for transmitting and receiving communications, including UE communications manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting resynchronization signal transmission in wireless communications).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support resynchronization signal transmission in wireless communications. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
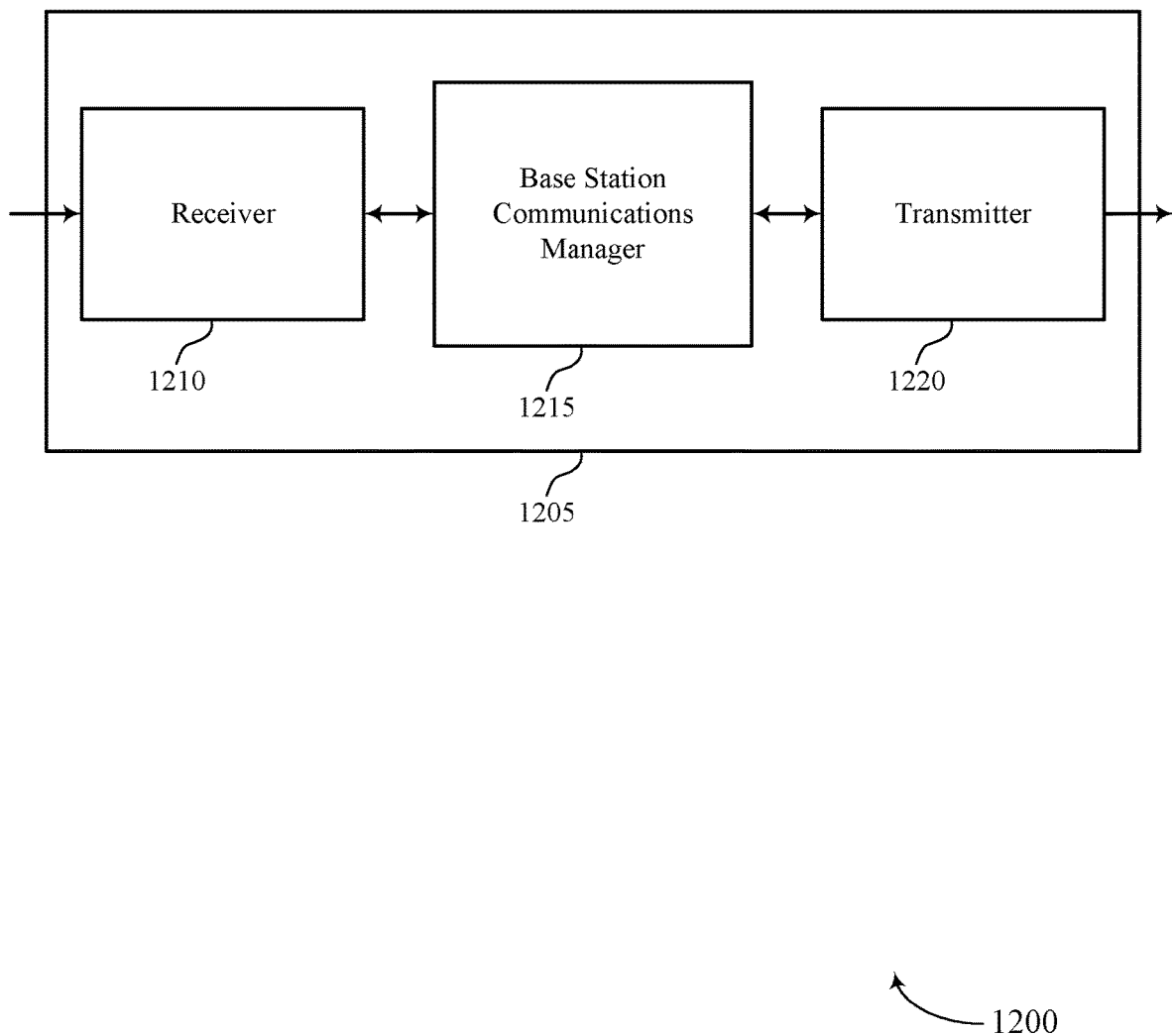
FIGS. 12 through 14 show block diagrams of a device that supports resynchronization signal transmission in wireless communications in accordance with aspects of the present disclosure.

FIG. 12 shows a block diagram 1200 of a wireless device 1205 that supports resynchronization signal transmission in wireless communications in accordance with aspects of the present disclosure. Wireless device 1205 may be an example of aspects of a base station 105 as described herein. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to resynchronization signal transmission in wireless communications, etc.). Information may be passed on to other components of the device. The receiver 1210 may be an example of aspects of the transceiver 1535 described with reference to FIG. 15. The receiver 1210 may utilize a single antenna or a set of antennas.

Base station communications manager 1215 may be an example of aspects of the base station communications manager 1515 described with reference to FIG. 15.

Base station communications manager 1215 and/or at least some of its various sub-components may be implemented in hardware, software executed by a processor, firmware, or any combination thereof. If implemented in software executed by a processor, the functions of the base station communications manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1215 and/or at least some of its various sub-components may be physically located at various positions, including being distributed such that portions of functions are implemented at different physical locations by one or more physical devices. In some examples, base station communications manager 1215 and/or at least some of its various sub-components may be a separate and distinct component in accordance with various aspects of the present disclosure. In other examples, base station communications manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some examples, base station communications manager 1215 may receive, from a UE, an indication that the UE is capable of processing a RSS, identify, based on the indication, a set of prioritization rules for transmitting RSS transmissions and one or more other concurrent transmissions to the UE, and transmit the RSS and one or more other concurrent transmissions to the UE based on the identified set of prioritization rules.

In some examples, base station communications manager 1215 may receive, from a UE, an indication that the UE is capable of processing a RSS, determine, by the base station, that first wireless resources allocated to an RSS transmission at least partially overlap with second wireless resources allocated to another transmission of the one or more transmission types, and transmit, to the UE, the RSS transmission or the other transmission, or any combination thereof, based on one or more prioritization rules that prioritize one or more transmission types relative to the RSS.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Figure 13:
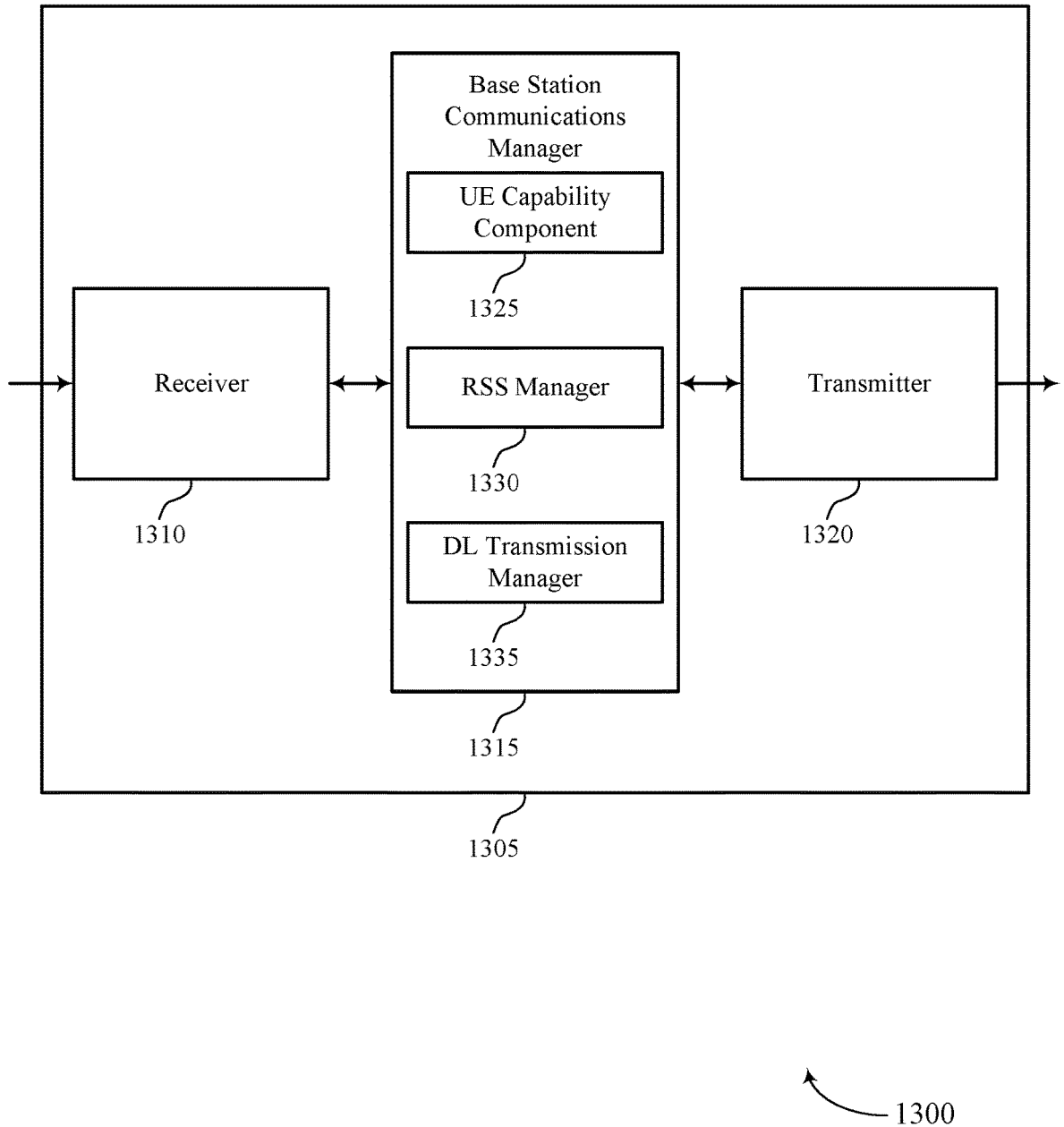

FIG. 13 shows a block diagram 1300 of a wireless device 1305 that supports resynchronization signal transmission in wireless communications in accordance with aspects of the present disclosure. Wireless device 1305 may be an example of aspects of a wireless device 1205 or a base station 105 as described with reference to FIG. 12. Wireless device 1305 may include receiver 1310, base station communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to resynchronization signal transmission in wireless communications, etc.). Information may be passed on to other components of the device. The receiver 1310 may be an example of aspects of the transceiver 1535 described with reference to FIG. 15. The receiver 1310 may utilize a single antenna or a set of antennas.

Base station communications manager 1315 may be an example of aspects of the base station communications manager 1515 described with reference to FIG. 15.

Base station communications manager 1315 may also include UE capability component 1325, RSS manager 1330, and DL transmission manager 1335.

UE capability component 1325 may receive, from a UE, an indication that the UE is capable of processing an RSS. In some cases, the indication that the UE is capable of processing the RSS is an explicit indication received from the UE. In some cases, the indication that the UE is capable of processing the RSS is an implicit indication based on a one or more of a signaled UE capability, UE category, or any combination thereof.

RSS manager 1330 may identify, based on the indication, a set of prioritization rules for transmitting RSS transmissions and one or more other concurrent transmissions to the UE. In some cases, RSS manager 1330 may transmit the RSS via a first set of RBGs. In some cases, RSS manager 1330 may identify the set of prioritization rules for transmitting the RSS and one or more other concurrent transmissions based on an identified operating mode. In some cases, the set of prioritization rules is based on a prioritization for the one or more other concurrent transmissions relative to the RSS. In some cases, a set of prioritization rules is associated with rate-matching the one or more other concurrent transmissions around the RSS based on the UE operating in a mobile broadband (MBB) mode or a first coverage enhancement mode. In some cases, the UE determines that one of rate-matching, puncturing, or non-overlapping resource block group scheduling (e.g., dropping) is used for overlapping transmissions based on the UE operating in a second coverage enhancement mode that provides additional coverage enhancement relative to the first coverage enhancement mode. RSS manager 1330 may also determine that first wireless resources allocated to an RSS transmission at least partially overlap with second wireless resources allocated to another transmission of one or more transmission types DL transmission manager 1335 may transmit the RSS and one or more other concurrent transmissions to the UE based on the identified set of prioritization rules. In some cases, DL transmission manager 1335 may transmit, to the UE, the RSS transmission or the other transmission, or any combination thereof, based on one or more prioritization rules that prioritize one or more transmission types relative to the RSS. In some cases, DL transmission manager 1335 identify an overlapping portion of wireless resources of the RSS and at least a first downlink shared channel transmission, puncture the overlapping portion of wireless resources of the first downlink shared channel transmission with the RSS, and transmit the RSS and a remaining portion of the first downlink shared channel transmission. In some cases, DL transmission manager 1335 may identify that a broadcast transmission and the RSS have at least partially overlapping wireless resource, puncture a first portion of the RSS with a first portion of the broadcast transmission, and puncture a second portion of the broadcast transmission with a second portion of the RSS. In some cases, DL transmission manager 1335 may transmit remaining portions of the RSS and the broadcast transmission.

In some cases, DL transmission manager 1335 may encode control information only in control channel transmissions that are non-overlapping with wireless resources for the RSS. In some cases, DL transmission manager 1335 may identify that wireless resources for control channel transmissions are at least partially overlapping with wireless resources for the RSS and puncture the control channel transmissions that are at least partially overlapping with wireless resources for the RSS. In some cases, DL transmission manager 1335 may select one of puncturing or skipping encoding of control information in the control channel transmissions that are at least partially overlapping with wireless resources for the RSS. In some cases, DL transmission manager 1335 may identify that at least a portion of wireless resources for the RSS are overlapping with wireless resources for one or more of a PSS, an SSS or a PBCH signal, puncture the RSS with one or more of the PSS, SSS, or PBCH in the overlapping portion of wireless resources, and transmit one or more of the PSS, SSS, or PBCH via the overlapping portion of wireless resources. In some cases, puncturing of a broadcast transmission is based on a content of the first portion and the second portion of the broadcast transmission. In some cases, the selecting is based on one or more of UE capability to process the RSS, a UE transmission mode, a bandwidth of SIB signaling, or any combination thereof.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
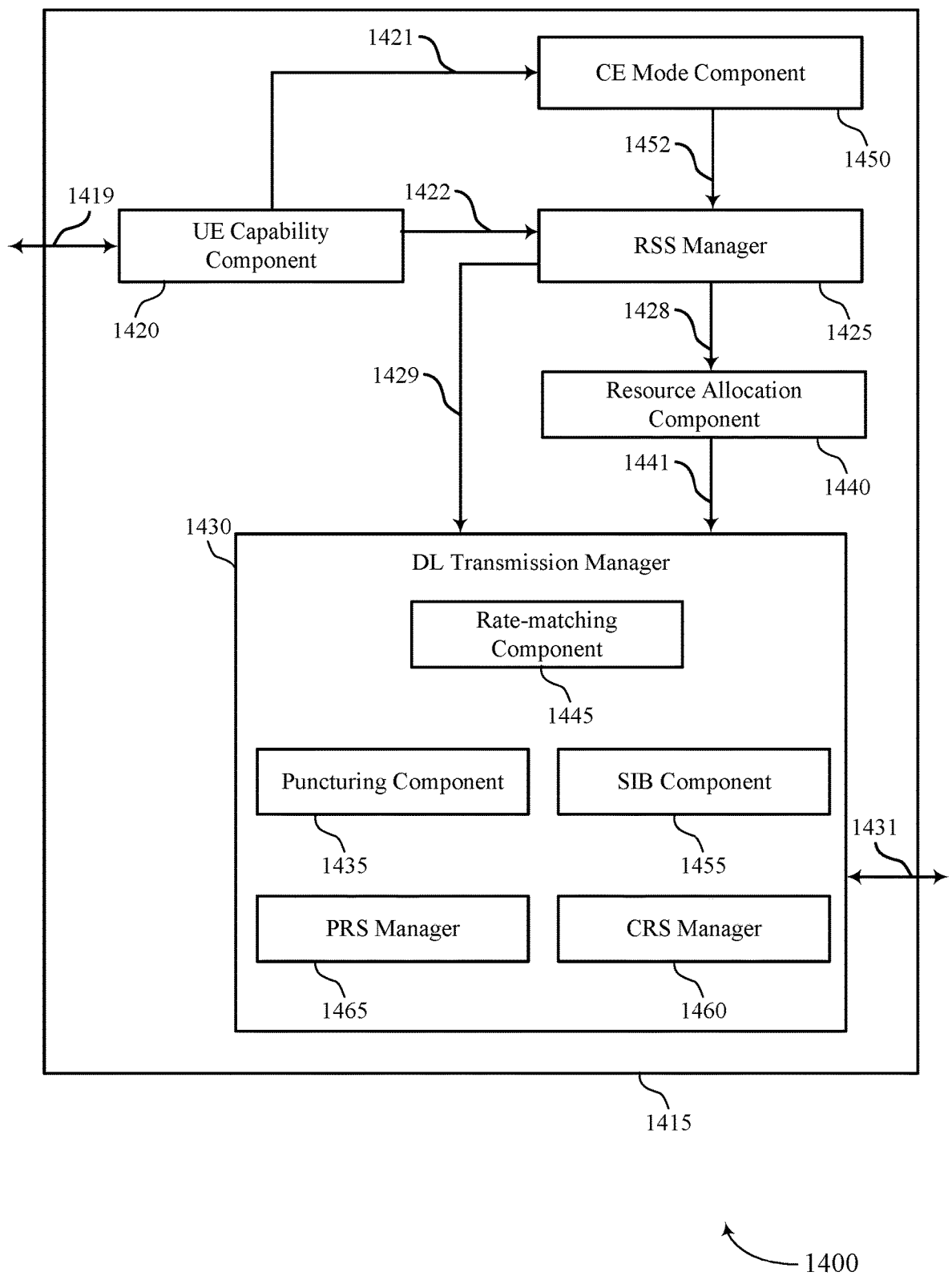

FIG. 14 shows a block diagram 1400 of a base station communications manager 1415 that supports resynchronization signal transmission in wireless communications in accordance with aspects of the present disclosure. The base station communications manager 1415 may be an example of aspects of a base station communications manager 1515 described with reference to FIGS. 12, 13, and 15. The base station communications manager 1415 may include UE capability component 1420, RSS manager 1425, DL transmission manager 1430, puncturing component 1435, resource allocation component 1440, rate-matching component 1445, CE mode component 1450, SIB component 1455, CRS manager 1460, and PRS manager 1465. Each of these modules may communicate, directly or indirectly, with one another (e.g., via one or more buses).

UE capability component 1420 may receive, from a UE, an indication 1419 that the UE is capable of processing an RSS. In some cases, the indication that the UE is capable of processing the RSS is an explicit indication received from the UE. In some cases, the indication that the UE is capable of processing the RSS is an implicit indication based on a one or more of a signaled UE capability, UE category, or any combination thereof.

In some cases, UE capability component 1420 transmits RSS indicator 1422 to RSS manager 1425 and/or an operating mode indicator 1421 to CE mode component 1450. RSS indicator 1422 may be used to indicate to RSS manager 1425 that a UE is capable of receiving RSS. Operating mode indicator 1421 may be used to indicate that a UE is in a particular operating mode.

CE mode component 1450 may identify an operating mode of the UE. In some cases, CE mode component 1450 may send an CE mode indicator 1452 of the identified operation mode to RSS manager 1425. In some cases, RSS manager 1425 may update a set of prioritization rules for transmitting RSS transmissions based on the indicated operating mode—e.g., reordering a set of prioritization rules.

RSS manager 1425 may identify, based on RSS indicator 1422 and/or CE mode indicator 1452, a set of prioritization rules for transmitting RSS transmissions and one or more other concurrent transmissions to the UE. In some cases, RSS manager 1425 may transmit the RSS via a first set of RBGs. In some cases, RSS manager 1425 may identify the set of prioritization rules for transmitting the RSS and one or more other concurrent transmissions based on an identified operating mode. In some cases, the set of prioritization rules for transmitting the RSS and one or more other concurrent transmissions includes a rule set that is based on a prioritization for the one or more other concurrent transmissions relative to the RSS. In some cases, a set of prioritization rules associated with rate-matching the one or more other concurrent transmissions around the RSS is selected based on the UE operating in a mobile broadband (MBB) mode or a first coverage enhancement mode. In some cases, a set of prioritization rules associated with one of rate-matching, puncturing, or non-overlapping resource block group scheduling (e.g., dropping) is selected based on the UE operating in a second coverage enhancement mode that provides additional coverage enhancement relative to the first coverage enhancement mode.

RSS manager 1425 may also determine that first wireless resources allocated to an RSS transmission at least partially overlap with second wireless resources allocated to another transmission of the one or more transmission types. In some cases, the prioritization is based on one or more of a UE capability to process the RSS, a UE transmission mode, a bandwidth of SIB signaling, or any combination thereof.

In some cases, RSS manager 1425 may send RSS information 1429 to DL transmission manager 1430. RSS information 1429 may include a prioritization rules for receiving overlapping RSS and other transmissions. RSS manager 1425 may also send RSS scheduling information 1428 to resource allocation component 1440. RSS scheduling information 1428 may indicate subsequent resources allocated to RSS transmissions.

Resource allocation component 1440 may allocate RSS resources for the RSS within a resource block group (RBG) or a narrowband operating bandwidth of the UE, transmit an indication of the RSS resources to the UE. In some cases, resource allocation component 1440 may identify a first set of resource block groups (RBGs) allocated for the RSS, and schedule downlink shared channel transmissions using a second set of RBGs that are non-overlapping with the first set of RBGs. In some cases, the indication of the RSS resources includes an indication of the RBG containing the RSS or a narrowband index.

In some cases, resource allocation component 1440 sends conflict indicator 1441 to DL transmission manager 1430. Conflict indicator 1441 may indicate that one or more wireless resources are allocated for both RSS transmissions and one or more other types of transmissions.

DL transmission manager 1430 may transmit the RSS and one or more other concurrent transmissions to the UE based on the identified set of prioritization rules. In some cases, DL transmission manager 1430 identify an overlapping portion of wireless resources of the RSS and at least a first downlink shared channel transmission, puncture the overlapping portion of wireless resources of the first downlink shared channel transmission with the RSS, and transmit the RSS and a remaining portion of the first downlink shared channel transmission. In some cases, DL transmission manager 1430 may identify that a broadcast transmission and the RSS have at least partially overlapping wireless resource, puncture a first portion of the RSS with a first portion of the broadcast transmission, and puncture a second portion of the broadcast transmission with a second portion of the RSS. In some cases, DL transmission manager 1430 may transmit remaining portions of the RSS and the broadcast transmission.

In some cases, DL transmission manager 1430 may encode control information only in control channel transmissions that are non-overlapping with wireless resources for the RSS. In some cases, DL transmission manager 1430 may identify that wireless resources for control channel transmissions are at least partially overlapping with wireless resources for the RSS and puncture the control channel transmissions that are at least partially overlapping with wireless resources for the RSS. In some cases, DL transmission manager 1430 may select one of puncturing or skipping encoding of control information in the control channel transmissions that are at least partially overlapping with wireless resources for the RSS. In some cases, DL transmission manager 1430 may identify that at least a portion of wireless resources for the RSS are overlapping with wireless resources for one or more of a PSS, an SSS or a PBCH signal, puncture the RSS with one or more of the PSS, SSS, or PBCH in the overlapping portion of wireless resources, and transmit one or more of the PSS, SSS, or PBCH via the overlapping portion of wireless resources. In some cases, puncturing of a broadcast transmission is based on a content of the first portion and the second portion of the broadcast transmission. In some cases, the selecting is based on one or more of UE capability to process the RSS, a UE transmission mode, a bandwidth of SIB signaling, or any combination thereof.

DL transmission manager 1430 may also transmit, to the UE, the RSS transmission or the other transmission, or any combination thereof, based on one or more prioritization rules that prioritize one or more transmission types relative to the RSS. In some examples, the DL transmission manager 1430 may transmit, in the PRB or subframe, the other transmission and not the RSS transmission over the second wireless resources. In some cases, the other transmission includes a PSS, SSS, or PBCH transmission, or any combination thereof. In some cases, the other transmission includes a physical broadcast channel PBCH transmission carrying system information. In some cases, the other transmission includes a PDSCH transmission carrying system information.

In some cases, the other transmission includes a downlink shared channel transmission and DL transmission manager 1430 may transmit the RSS transmission over the first wireless resources and a remaining portion of the downlink shared channel transmission over a subset of the second wireless resources.

In some cases, the other transmission includes a downlink shared channel transmission and DL transmission manager 1430 may transmit the RSS transmission over the first wireless resources and a remaining portion of the control channel transmission over a subset of the second wireless resources.

DL transmission manager 1430 may include rate-matching component 1445, puncturing component 1435, SIB component 1455, PRS manager 1465, and CRS manager 1460. DL transmission manager 1430 may use one or more of these component to transmit transmission 1431, which may be an RSS transmission, another overlapping transmission, or a combination thereof, based on determining that the transmission are overlapping and a set of prioritization rules.

Puncturing component 1435 may determine, based on the identified set of prioritization rules, that the RSS is to be punctured or delayed for at least a first portion of the RSS that overlaps with a first transmission of the one or more other transmissions.

Puncturing component 1435 may also drop, for the PRB or subframe, the RSS transmission based on the one or more prioritization rules. In some examples, the puncturing component 1435 may puncture, based on the one or more prioritization rules and determining that the first wireless resources overlap with the second wireless resources, a portion of a downlink shared channel transmission with the RSS transmission. In some examples, the puncturing component 1435 may puncture, based on the one or more prioritization rules and determining that the first wireless resources overlap with the second wireless resources, a control channel transmission with the RSS transmission.

Rate-matching component 1445 may rate-match a downlink shared channel transmission around the RSS and transmit the RSS and the rate-matched downlink shared channel transmission.

SIB component 1455 may identify a type of SIB signal that includes RSS information, identify the set of prioritization rules for transmitting the RSS and one or more other concurrent transmissions based on the identified type of SIB. In some cases, SIB component 1455 may identify that the UE is in a coverage enhancement mode and identify the set of prioritization rules for transmitting the RSS and one or more other concurrent transmissions based on the identified type of SIB and the identified coverage enhancement mode. In some cases, the types of SIB include a SIB1 for non-eMTC/CE-mode UEs and a SIB1-BR for eMTC/CE-mode UEs.

CRS manager 1460 may identify whether the UE is in a CRS transmission mode or a DMRS transmission mode and identify the set of prioritization rules for transmitting the RSS and one or more other concurrent transmissions based on the identified transmission mode. In some cases, CRS manager 1460 may select one of a rate-matching, puncturing, or non-overlapping resource block group scheduling (e.g., dropping) based on the transmission mode. In some cases, CRS manager 1460 may identify that at least a portion of wireless resources for the RSS are overlapping with wireless resources for CRS transmissions, puncture the RSS with the CRS in the overlapping portion of wireless resources, transmit the CRS, and transmit remaining portions of the RSS. in some cases, CRS manager 1460 may, identify a subset of the overlapping resources during which CRS muting is applied, and transmit a portion of the RSS via the subset of the overlapping resources.

PRS manager 1465 may identify one or more physical resource blocks (PRBs) in a subframe in which the RSS overlaps with a PRS and drop the RSS in the identified PRBs or the subframe based on the identifying. In some cases, PRS manager 1465 may similarly drop RSS transmission in a PRB or subframe in which the RSS overlaps with other transmissions, such as PSS, SSS, or PBCH transmissions, or data or control transmissions associated with a random access procedure.

Figure 15:
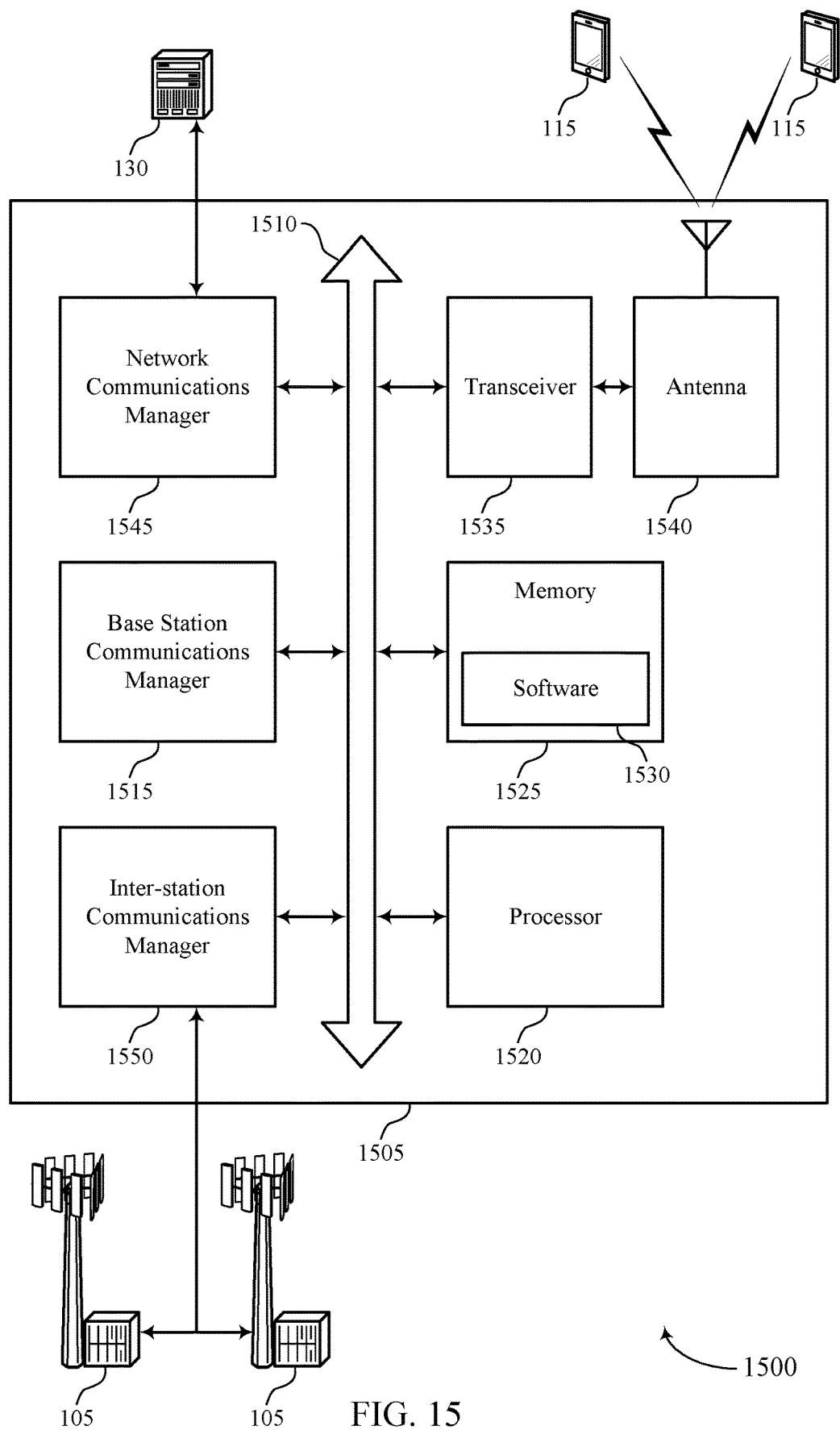
FIG. 15 illustrates a block diagram of a system including a base station that supports resynchronization signal transmission in wireless communications in accordance with aspects of the present disclosure.

FIG. 15 shows a diagram of a system 1500 including a device 1505 that supports resynchronization signal transmission in wireless communications in accordance with aspects of the present disclosure. Device 1505 may be an example of or include the components of base station 105 as described above, e.g., with reference to FIG. 1. Device 1505 may include components for bi-directional voice and data communications including components for transmitting and receiving communications, including base station communications manager 1515, processor 1520, memory 1525, software 1530, transceiver 1535, antenna 1540, network communications manager 1545, and inter-station communications manager 1550. These components may be in electronic communication via one or more buses (e.g., bus 1510). Device 1505 may communicate wirelessly with one or more UEs 115.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting resynchronization signal transmission in wireless communications).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware or software operation such as the interaction with peripheral components or devices.

Software 1530 may include code to implement aspects of the present disclosure, including code to support resynchronization signal transmission in wireless communications. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115.

Inter-station communications manager 1550 may manage communications with other base station 105 and may include a controller or scheduler for controlling communications with UEs 115 in cooperation with other base stations 105. For example, the inter-station communications manager 1550 may coordinate scheduling for transmissions to UEs 115 for various interference mitigation techniques such as beamforming or joint transmission. In some examples, inter-station communications manager 1550 may provide an X2 interface within a Long Term Evolution (LTE)/LTE-A wireless communication network technology to provide communication between base stations 105.

Figure 16:
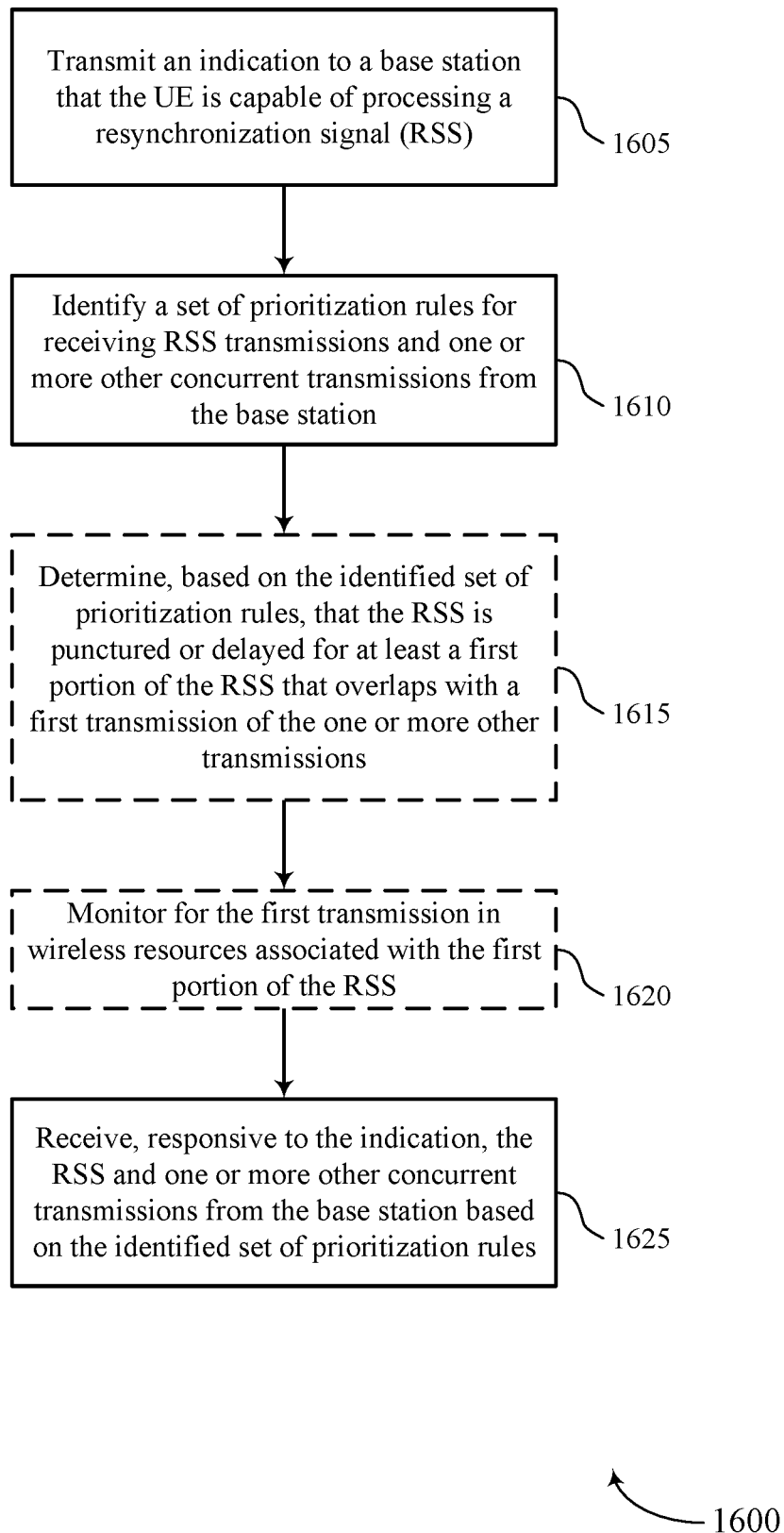
FIGS. 16 through 20 illustrate methods for resynchronization signal transmission in wireless communications in accordance with aspects of the present disclosure.

FIG. 16 shows a flowchart illustrating a method 1600 for resynchronization signal transmission in wireless communications in accordance with aspects of the present disclosure. The operations of method 1600 may be implemented by a UE 115 or its components as described herein. For example, the operations of method 1600 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may transmit an indication to a base station that the UE is capable of processing an RSS. The operations of 1605 may be performed according to the methods described herein. In certain examples, aspects of the operations of 1605 may be performed by a UE capability component as described with reference to FIGS. 8 through 11. In some cases, the indication that the UE is capable of processing the RSS is an explicit indication. In some cases, the indication that the UE is capable of processing the RSS is an implicit indication based on one or more of a signaled UE capability, UE category, or any combination thereof.

At 1610 the UE 115 may identify, at the UE, a set of prioritization rules for receiving RSS transmissions and one or more other concurrent transmissions from the base station. The operations of 1610 may be performed according to the methods described herein. In certain examples, aspects of the operations of 1610 may be performed by an RSS manager as described with reference to FIGS. 8 through 11. In some cases, a set of prioritization rules such as described with reference to FIG. 3 may be identified, which may establish one or more rules for puncturing, rate matching, or scheduling of different transmissions.

At 1615 the UE 115 may optionally determine, based at least in part on the identified set of prioritization rules, that the RSS is punctured or delayed for at least a first portion of the RSS that overlaps with a first transmission of the one or more other transmissions. The operations of 1615 may be performed according to the methods described herein. In certain examples, aspects of the operations of 1615 may be performed by an RSS manager as described with reference to FIGS. 8 through 11. Such a determination may be made according to one or more rules for puncturing, rate matching, or scheduling of different transmissions.

At 1620 the UE 115 may optionally monitor for the first transmission in wireless resources associated with the first portion of the RSS. The operations of 1620 may be performed according to the methods described herein. In certain examples, aspects of the operations of 1620 may be performed by a DL reception manager as described with reference to FIGS. 8 through 11. The first transmission may be monitored, for example, if it is determined that the first transmission punctures the RSS of if the RSS is delayed for the first transmission. In some cases, such monitoring may be performed according to the set of prioritization rules associated with concurrent RSS and other downlink transmissions.

Figure 17:
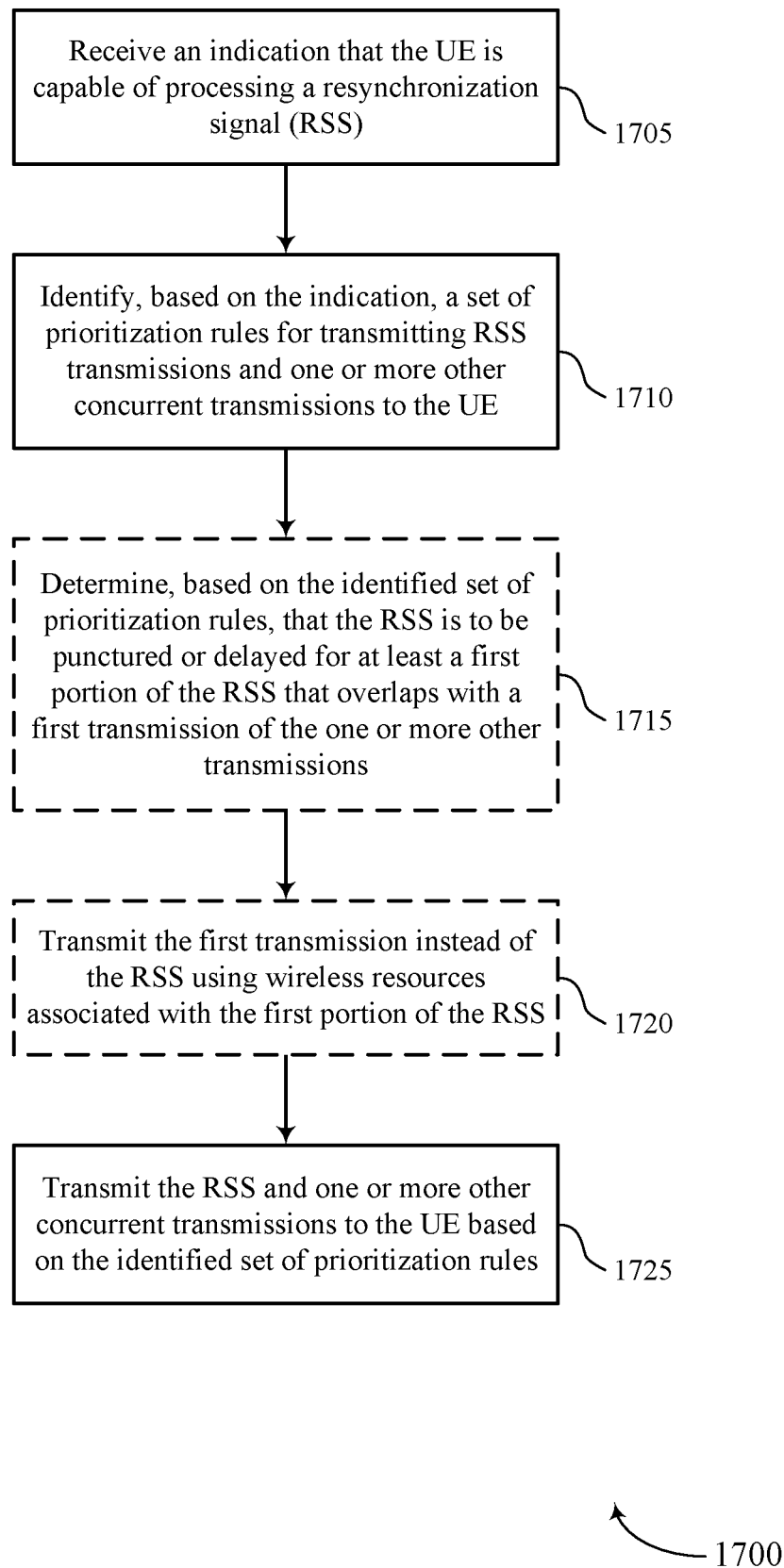

At 1625 the UE 115 may receive, responsive to the capability indication, the RSS and one or more other concurrent transmissions from the base station based on the identified set of prioritization rules. The operations of 1625 may be performed according to the methods described herein. In certain examples, aspects of the operations of 1625 may be performed by a DL reception manager as described with reference to FIGS. 8 through 11. The RSS may be received by buffering signals from associated wireless resources and attempting to decode the buffered signals according to decoding candidates associated with the RSS. In some cases, such reception may be performed according to the set of prioritization rules associated with concurrent RSS and other downlink transmissions FIG. 17 shows a flowchart illustrating a method 1700 for resynchronization signal transmission in wireless communications in accordance with aspects of the present disclosure. The operations of method 1700 may be implemented by a base station 105 or its components as described herein. For example, the operations of method 1700 may be performed by a base station communications manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At 1705 the base station 105 may receive, from a user equipment (UE), an indication that the UE is capable of processing an RSS. The operations of 1705 may be performed according to the methods described herein. In certain examples, aspects of the operations of 1705 may be performed by a UE capability component as described with reference to FIGS. 12 through 15. In some cases, the indication that the UE is capable of processing the RSS is an explicit indication. In some cases, the indication that the UE is capable of processing the RSS is an implicit indication based on a one or more of a signaled UE capability, UE category, or any combination thereof.

At 1710 the base station 105 may identify, based at least in part on the indication, a set of prioritization rules for transmitting RSS transmissions and one or more other concurrent transmissions to the UE. The operations of 1710 may be performed according to the methods described herein. In certain examples, aspects of the operations of 1710 may be performed by an RSS manager as described with reference to FIGS. 12 through 15. In some cases, a set of prioritization rules such as described with reference to FIG. 3 may be identified, which may establish one or more rules for puncturing, rate matching, or scheduling of different transmissions. In some cases, the set of prioritization rules may be based on one or more parameters or operating modes that may be configured at the UE.

At 1715 the base station 105 may optionally determine, based at least in part on the identified set of prioritization rules, that the RSS is to be punctured or delayed for at least a first portion of the RSS that overlaps with a first transmission of the one or more other transmissions. The operations of 1715 may be performed according to the methods described herein. In certain examples, aspects of the operations of 1715 may be performed by a puncturing component as described with reference to FIGS. 12 through 15. Such a determination may be made according to one or more rules for puncturing, rate matching, or scheduling of different transmissions.

At 1720 the base station 105 may optionally transmit the first transmission instead of the RSS using wireless resources associated with the first portion of the RSS. The operations of 1720 may be performed according to the methods described herein. In certain examples, aspects of the operations of 1720 may be performed by a DL transmission manager as described with reference to FIGS. 12 through 15. The first transmission may be transmitted, for example, if it is determined that the first transmission punctures the RSS of if the RSS is delayed for the first transmission. In some cases, such transmission may be performed according to the set of prioritization rules associated with concurrent RSS and other downlink transmissions.

At 1725 the base station 105 may transmit the RSS and one or more other concurrent transmissions to the UE based at least in part on the identified set of prioritization rules. The operations of 1725 may be performed according to the methods described herein. In certain examples, aspects of the operations of 1725 may be performed by a DL transmission manager as described with reference to FIGS. 12 through 15.

Figure 18:
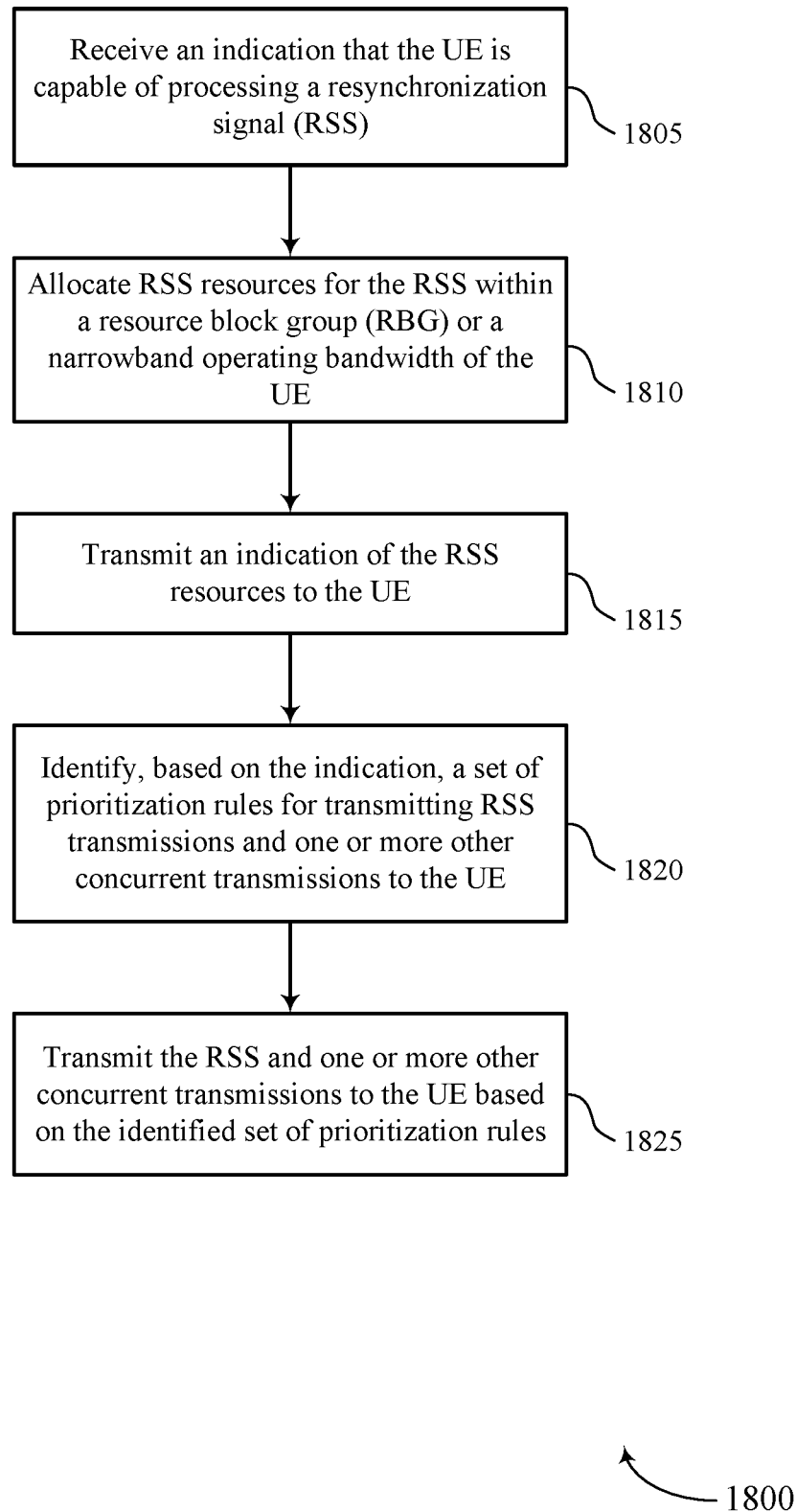

FIG. 18 shows a flowchart illustrating a method 1800 for resynchronization signal transmission in wireless communications in accordance with aspects of the present disclosure. The operations of method 1800 may be implemented by a base station 105 or its components as described herein. For example, the operations of method 1800 may be performed by a base station communications manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At 1805 the base station 105 may receive, from a user equipment (UE), an indication that the UE is capable of processing an RSS. The operations of 1805 may be performed according to the methods described herein. In certain examples, aspects of the operations of 1805 may be performed by a UE capability component as described with reference to FIGS. 12 through 15.

At 1810 the base station 105 may allocate RSS resources for the RSS within a resource block group (RBG) or a narrowband operating bandwidth of the UE. The operations of 1810 may be performed according to the methods described herein. In certain examples, aspects of the operations of 1810 may be performed by a resource allocation component as described with reference to FIGS. 12 through 15. In some cases, the RSS may be allocated to resources associated with an RBG or narrowband bandwidth.

At 1815 the base station 105 may transmit an indication of the RSS resources to the UE. The operations of 1815 may be performed according to the methods described herein. In certain examples, aspects of the operations of 1815 may be performed by a resource allocation component as described with reference to FIGS. 12 through 15.

At 1820 the base station 105 may identify, based at least in part on the capability indication from the UE, a set of prioritization rules for transmitting RSS transmissions and one or more other concurrent transmissions to the UE. The operations of 1820 may be performed according to the methods described herein. In certain examples, aspects of the operations of 1820 may be performed by an RSS manager as described with reference to FIGS. 12 through 15.

At 1825 the base station 105 may transmit the RSS and one or more other concurrent transmissions to the UE based at least in part on the identified set of prioritization rules. The operations of 1825 may be performed according to the methods described herein. In certain examples, aspects of the operations of 1825 may be performed by a DL transmission manager as described with reference to FIGS. 12 through 15.

Figure 19:
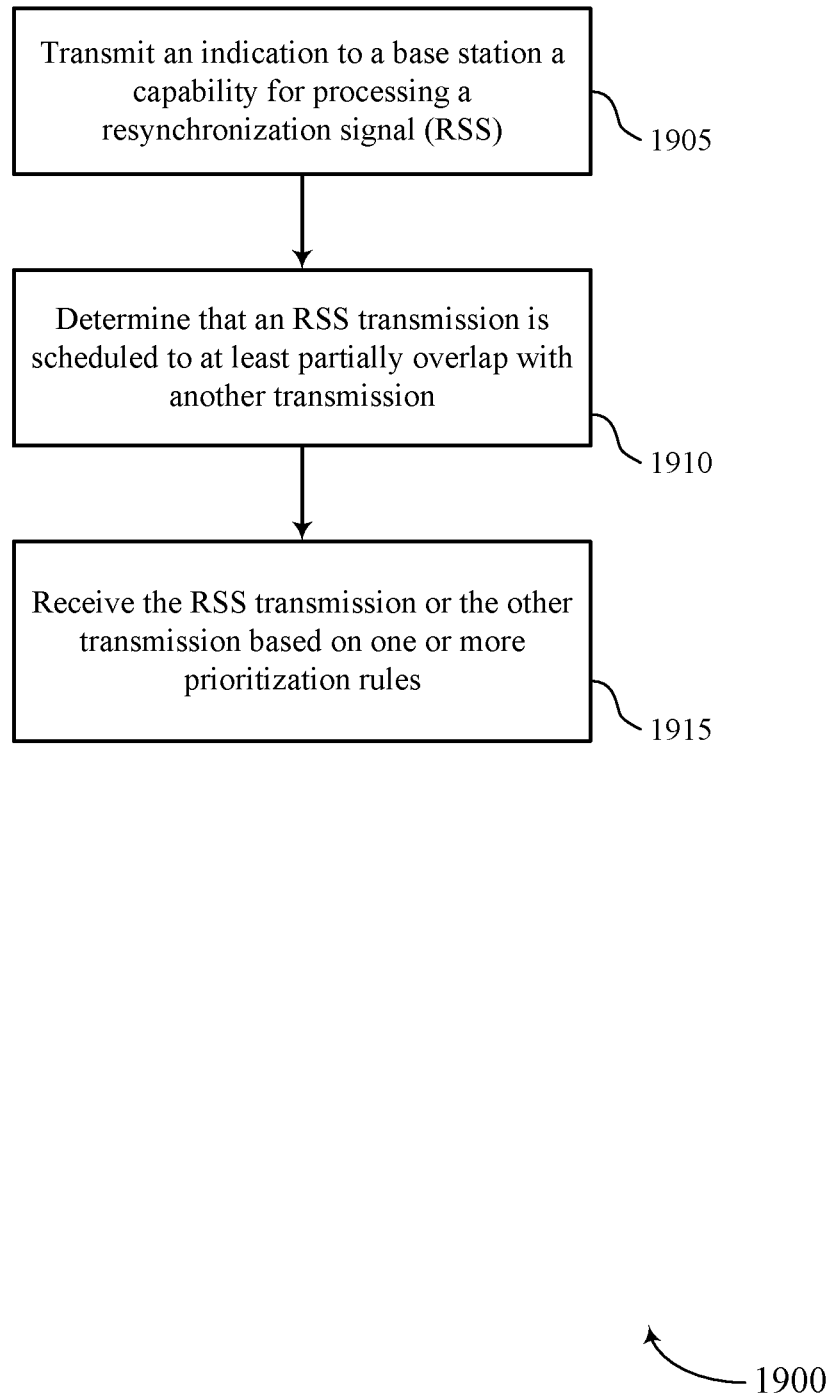

FIG. 19 shows a flowchart illustrating a method 1900 that supports resynchronization signal transmission in wireless communications in accordance with aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1905, the UE may transmit, from a UE, an indication to a base station that the UE is capable of processing an RSS. The operations of 1905 may be performed according to the methods described herein. In some examples, aspects of the operations of 1905 may be performed by a UE capability component as described with reference to FIGS. 8 through 11.

At 1910, the UE may determine, at the UE, that an RSS transmission is scheduled for first wireless resources that at least partially overlap with second wireless resources scheduled for another transmission of one or more transmission types. The operations of 1910 may be performed according to the methods described herein. In some examples, aspects of the operations of 1910 may be performed by an RSS manager as described with reference to FIGS. 8 through 11.

At 1915, the UE may receive, from the base station, the RSS transmission or the other transmission, or any combination thereof, based on one or more prioritization rules that prioritize the one or more transmission types relative to the RSS. The operations of 1915 may be performed according to the methods described herein. In some examples, aspects of the operations of 1915 may be performed by a DL reception manager as described with reference to FIGS. 8 through 11.

In some examples, the RSS transmission is scheduled to overlap with another transmission within a subframe or PRB, and the UE determines that the RSS transmission has been dropped for the subframe or PRB based on the prioritization rules. In such cases, the UE may receive the other transmission over the second wireless resources. In some examples, the UE drops the RSS transmission when the other transmission includes PSS, SSS, PBCH, or system information, or any combination thereof.

In some examples, the RSS transmission is scheduled to overlap with a downlink shared channel transmission that does not include system information, and the UE determines that the downlink shared channel transmission is punctured by the RSS transmission. In such cases, the UE may receive the RSS transmission over the first wireless resources and a non-punctured portion of the downlink shared channel transmission over a subset of the second wireless resources (e.g., resources of the second wireless resources that do not overlap with the first wireless resources).

In some examples, the RSS transmission is scheduled to overlap with a control channel transmission, and the UE determines that the control channel transmission is punctured by the RSS transmission. In such cases, the UE may receive the RSS transmission over the first wireless resources and a non-punctured portion of the control channel transmission over a subset of the second wireless resources (e.g., resources of the second wireless resources that do not overlap with the first wireless resources). In other examples, when the RSS transmission overlaps with a control channel transmission, the UE may refrain from decoding control channel candidates for that time period.

Figure 20:
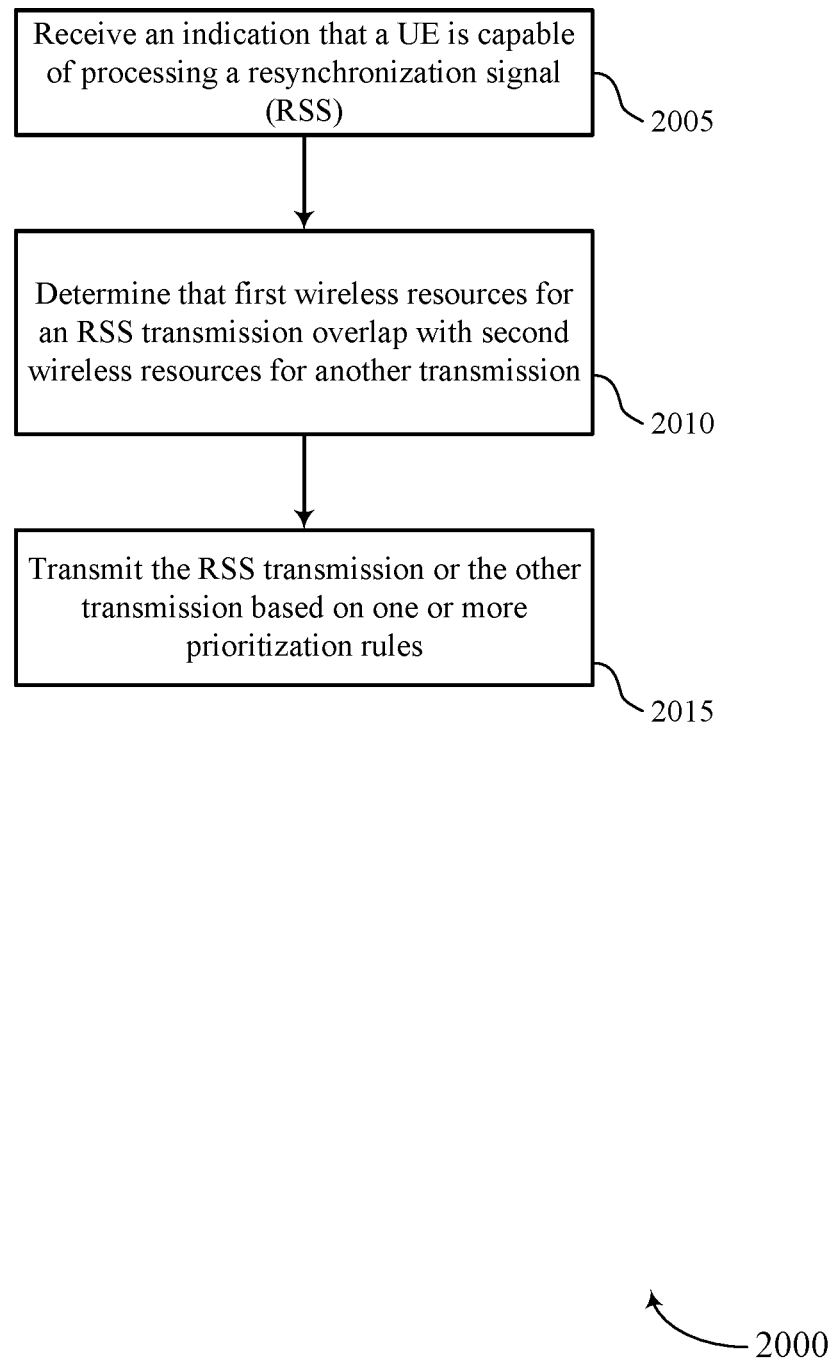

FIG. 20 shows a flowchart illustrating a method 2000 that supports resynchronization signal transmission in wireless communications in accordance with aspects of the present disclosure. The operations of method 2000 may be implemented by a base station 105 or its components as described herein. For example, the operations of method 2000 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2005, the base station may receive, from a UE, an indication that the UE is capable of processing an RSS. The operations of 2005 may be performed according to the methods described herein. In some examples, aspects of the operations of 2005 may be performed by a UE capability component as described with reference to FIGS. 12 through 15.

At 2010, the base station may determine, by the base station, that first wireless resources allocated to an RSS transmission at least partially overlap with second wireless resources allocated to another transmission of one or more transmission types. The operations of 2010 may be performed according to the methods described herein. In some examples, aspects of the operations of 2010 may be performed by an RSS manager as described with reference to FIGS. 12 through 15.

At 2015, the base station may transmit, to the UE, the RSS transmission or the other transmission, or any combination thereof, based on one or more prioritization rules that prioritize the one or more transmission types relative to the RSS. The operations of 2015 may be performed according to the methods described herein. In some examples, aspects of the operations of 2015 may be performed by a DL transmission manager as described with reference to FIGS. 12 through 15.

In some examples, the RSS transmission is scheduled to overlap with another transmission within a subframe or PRB, and the base station drops the RSS transmission for the subframe or PRB based on the prioritization rules. In such cases, the base station may transmit the other transmission over the second wireless resources and may not transmit the RSS transmission. In some examples, the base station drops the RSS transmission when the other transmission includes PSS, SSS, PBCH, or system information, or any combination thereof.

In some examples, the RSS transmission is scheduled to overlap with a downlink shared channel transmission that does not include system information, and the base station punctures the downlink shared channel transmission with the RSS transmission. In such cases, the base station may transmit the RSS transmission over the first wireless resources and a non-punctured portion of the downlink shared channel transmission over a subset of the second wireless resources (e.g., resources of the second wireless resources that do not overlap with the first wireless resources).

In some examples, the RSS transmission is scheduled to overlap with a control channel transmission that does not include system information, and the base station punctures the control channel transmission with the RSS transmission. In such cases, the base station may transmit the RSS transmission over the first wireless resources and a non-punctured portion of the control channel transmission over a subset of the second wireless resources (e.g., resources of the second wireless resources that do not overlap with the first wireless resources).

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved-UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication, comprising:
   transmitting, from a user equipment (UE), an indication to a network device that the UE is capable of processing a resynchronization signal (RSS);
   determining, at the UE, based on being scheduled for periodic RSS transmissions, that an RSS transmission is scheduled for first wireless resources that are in a same physical resource block (PRB) or subframe as second wireless resources scheduled for another transmission of one or more transmission types, wherein the other transmission comprises a downlink shared channel transmission or a downlink control channel transmission;
   determining, based at least in part on one or more prioritization rules and determining that the first wireless resources are in the same PRB or subframe as the second wireless resources, that at least a portion of the other transmission is punctured by the RSS transmission;
   receiving, from the network device, the RSS transmission over the first wireless resources in accordance with the one or more prioritization rules that prioritize the one or more transmission types relative to the RSS based at least in part on the RSS transmission being scheduled in the same PRB or subframe as the other transmission.

2. The method of claim 1, further comprising:
   receiving a non-punctured portion of the other transmission over a subset of the second wireless resources; and
   decoding the non-punctured portion of the other transmission.

3. The method of claim 1, wherein:
   the other transmission comprises the downlink control channel transmission; and
   receiving the RSS transmission or the other transmission comprises:
      refraining from decoding control channel candidates associated with the second wireless resources based at least in part on the one or more prioritization rules and determining that the first wireless resources at least partially overlap with the second wireless resources.

4. The method of claim 1, further comprising:
   monitoring for the RSS transmission in the first wireless resources based at least in part on the one or more prioritization rules.

5. The method of claim 1, wherein the downlink control channel transmission is a machine-type communications (MTC) physical downlink control channel (MPDCCH) transmission.

6. A method for wireless communication at a network device, comprising:
   receiving, from a user equipment (UE), an indication that the UE is capable of processing a resynchronization signal (RSS);
   determining, by the network device, that first wireless resources allocated to an RSS transmission are in a same physical resource block (PRB) or subframe as second wireless resources allocated to another transmission of one or more transmission types, wherein the other transmission comprises a downlink shared channel transmission or a downlink control channel transmission;
   puncturing, based at least in part on one or more prioritization rules and determining that the first wireless resources are in the same PRB or subframe as the second wireless resources, at least a portion of the other transmission with the RSS transmission; and
   transmitting, to the UE, the RSS transmission over the first wireless resources in accordance with the one or more prioritization rules that prioritize the one or more transmission types relative to the RSS.

7. The method of claim 6, further comprising:
   transmitting a remaining portion of the other transmission over a subset of the second wireless resources.

8. The method of claim 6, wherein the one or more prioritization rules are based at least in part on one or more of a UE capability to process the RSS, a UE transmission mode, a bandwidth of system information block (SIB) signaling, or any combination thereof.

9. The method of claim 6, wherein the downlink control channel transmission is a machine-type communications (MTC) physical downlink control channel (MPDCCH) transmission.

10. An apparatus for wireless communication, comprising:
    a processor;
    memory in electronic communication with the processor; and
    instructions stored in the memory and executable by the processor to cause the apparatus to:
       transmit, from a user equipment (UE), an indication to a network device that the UE is capable of processing a resynchronization signal (RSS);
       determine, at the UE, based on being scheduled for periodic RSS transmissions, that an RSS transmission is scheduled for first wireless resources that are in a same physical resource block (PRB) or subframe as second wireless resources scheduled for another transmission of one or more transmission types, wherein the other transmission comprises a downlink shared channel transmission or a downlink control channel transmission;
       determine, based at least in part on one or more prioritization rules and determining that the first wireless resources are in the same PRB or subframe as the second wireless resources, that at least a portion of the other transmission is punctured by the RSS transmission;
       receive, from the network device, the RSS transmission over the first wireless resources in accordance with the one or more prioritization rules that prioritize the one or more transmission types relative to the RSS based at least in part on the RSS transmission being scheduled in the same PRB or subframe as the other transmission.

11. The apparatus of claim 10, wherein the processor is further executable to cause the apparatus to:

receive a non-punctured portion of the other transmission over a subset of the second wireless resources; and decode the non-punctured portion of the other transmission.

12. The apparatus of claim 10, wherein:

the other transmission comprises the downlink control channel transmission; and the processor is further executable to cause the apparatus to:

refrain from decoding control channel candidates associated with the second wireless resources based at least in part on the one or more prioritization rules and determining that the first wireless resources at least partially overlap with the second wireless resources.

13. The apparatus of claim 10, wherein the processor is further executable to cause the apparatus to:

monitor for the RSS transmission in the first wireless resources based at least in part on the one or more prioritization rules.

14. The apparatus of claim 10, wherein the downlink control channel transmission is a machine-type communications (MTC) physical downlink control channel (MPDCCH) transmission.

15. An apparatus for wireless communication at a network device, comprising:

a processor;

memory in electronic communication with the processor; and instructions stored in the memory and executable by the processor to cause the apparatus to:

receive, from a user equipment (UE), an indication that the UE is capable of processing a resynchronization signal (RSS);

determine, by the network device, that first wireless resources allocated to an RSS transmission are in a same physical resource block (PRB) or subframe as second wireless resources allocated to another transmission of one or more transmission types, wherein the other transmission comprises a downlink shared channel transmission or a downlink control channel transmission;

puncture, based at least in part on one or more prioritization rules and determining that the first wireless resources are in the same PRB or subframe as the second wireless resources, at least a portion of the other transmission with the RSS transmission; and transmit, to the UE, the RSS transmission over the first wireless resources in accordance with the one or more prioritization rules that prioritize the one or more transmission types relative to the RSS.

16. The apparatus of claim 15, wherein the processor is further executable to cause the apparatus to:

transmit a remaining portion of the other transmission over a subset of the second wireless resources.

17. The apparatus of claim 15, wherein the one or more prioritization rules are based at least in part on one or more of a UE capability to process the RSS, a UE transmission mode, a bandwidth of system information block (SIB) signaling, or any combination thereof.

18. The apparatus of claim 15, wherein the downlink control channel transmission is a machine-type communications (MTC) physical downlink control channel (MPDCCH) transmission.

\* \* \* \* \*